United States Patent
Forbes

(10) Patent No.: US 12,337,586 B2
(45) Date of Patent: Jun. 24, 2025

(54) COMPOSITE BAMBOO INDUSTRIAL MATS AND METHODS OF MAKING THE SAME

(71) Applicant: Crocodile Products Inc., Calgary (CA)

(72) Inventor: Dean Forbes, Calgary (CA)

(73) Assignee: Crocodile Products Inc., Calgary (CA)

( * ) Notice: Subject to any disclaimer, the term of this patent is extended or adjusted under 35 U.S.C. 154(b) by 882 days.

(21) Appl. No.: 17/535,641

(22) Filed: Nov. 25, 2021

(65) Prior Publication Data
US 2023/0158773 A1 May 25, 2023

(51) Int. Cl.
| | |
|---|---|
| E01C 9/02 | (2006.01) |
| B27J 1/00 | (2006.01) |
| B32B 3/06 | (2006.01) |
| B32B 7/08 | (2019.01) |
| B32B 9/02 | (2006.01) |
| B32B 9/04 | (2006.01) |
| E01C 5/00 | (2006.01) |
| E01C 5/14 | (2006.01) |
| E01C 9/08 | (2006.01) |

(52) U.S. Cl.
CPC ............... *B32B 9/02* (2013.01); *B27J 1/00* (2013.01); *B32B 3/06* (2013.01); *B32B 7/08* (2013.01); *B32B 9/04* (2013.01); *E01C 5/005* (2013.01); *E01C 5/14* (2013.01); *E01C 9/086* (2013.01); *B32B 2307/732* (2013.01); *B32B 2471/04* (2013.01)

(58) Field of Classification Search
CPC . E01C 5/005; E01C 5/14; E01C 9/086; B32B 3/06; B32B 7/08; B32B 9/02; B32B 9/04; B32B 2307/732; B32B 2471/04; B27J 1/00

USPC .................. 404/34, 36, 40, 41, 46
See application file for complete search history.

(56) References Cited

U.S. PATENT DOCUMENTS

| | | | | |
|---|---|---|---|---|
| 4,600,336 A | * | 7/1986 | Waller, Jr. ............... | E01C 9/086 |
| | | | | 52/592.1 |
| 4,600,337 A | * | 7/1986 | Sarver ...................... | E01C 5/14 |
| | | | | 404/46 |

(Continued)

FOREIGN PATENT DOCUMENTS

CA       3235541 A1 *  5/2023  ............... B27J 1/00

*Primary Examiner* — Raymond W Addie
(74) *Attorney, Agent, or Firm* — Gowling WLG (Canada) LLP

(57) ABSTRACT

Disclosed are interlocking elongate composite bamboo industrial mats having an upper layer with two or more elongate laminated composite bamboo panels, an intermediate layer with a plurality of elongate laminated composite bamboo panels arranged in parallel and perpendicular to the laminated composite bamboo panels in the upper layer, and a bottom layer with a plurality of elongate laminated composite bamboo panels arranged in parallel to the upper layer. The three layers are secured together with fasteners consisting of a bolt, an outward-facing concave washer engaged with the bolt head, and a sleeve nut having an outward-facing washer engaged with the sleeve nut head. The interlocking elongate composite bamboo industrial mats are configured to interlock end-to-end or alternatively, side-to-side. Each of the elongate laminated composite bamboo panels comprises a plurality of kiln-dried glue-dipped elongate asymmetrically fractured bamboo strips compressed into a solid panel devoid of air spaces.

17 Claims, 15 Drawing Sheets

(56) References Cited

U.S. PATENT DOCUMENTS

| | | | | |
|---|---|---|---|---|
| 4,695,502 | A * | 9/1987 | Rush | E04H 17/16 |
| | | | | 428/53 |
| 4,875,800 | A * | 10/1989 | Hicks | E01C 9/086 |
| | | | | 404/46 |
| 5,087,149 | A * | 2/1992 | Waller, Jr. | E01C 9/086 |
| | | | | 52/177 |
| 5,201,601 | A * | 4/1993 | Stanley | E01C 9/086 |
| | | | | 404/46 |
| 7,404,690 | B2 * | 7/2008 | Lukasik | E01C 9/086 |
| | | | | 404/34 |
| 7,845,140 | B2 * | 12/2010 | Pervan | B32B 21/10 |
| | | | | 428/44 |
| 8,161,697 | B1 * | 4/2012 | McDonald | E04C 2/16 |
| | | | | 428/292.4 |
| 8,173,236 | B1 * | 5/2012 | McDonald | B32B 37/24 |
| | | | | 428/50 |
| 8,307,601 | B2 * | 11/2012 | Bonelli | E04B 1/04 |
| | | | | 52/587.1 |
| 8,784,001 | B1 * | 7/2014 | Phillips | E21B 41/0021 |
| | | | | 404/46 |
| 10,195,821 | B1 * | 2/2019 | McDonald | B32B 9/04 |
| 2005/0220539 | A1 * | 10/2005 | Yee | E04B 5/04 |
| | | | | 404/40 |
| 2008/0277055 | A1 * | 11/2008 | Yang | B27N 3/08 |
| | | | | 156/272.2 |
| 2009/0130377 | A1 * | 5/2009 | Samanta | C08J 5/045 |
| | | | | 428/113 |
| 2012/0240506 | A1 * | 9/2012 | Zhu | E04F 15/02 |
| | | | | 52/588.1 |
| 2016/0325530 | A1 * | 11/2016 | Slaven, Jr. | B32B 5/26 |
| 2017/0321435 | A1 * | 11/2017 | Chen | B32B 37/12 |

\* cited by examiner

COMPOSITE BAMBOO INDUSTRIAL MATS AND METHODS OF MAKING THE SAME

TECHNICAL FIELD

This disclosure generally relates to industrial mats for forming temporary roads and equipment support platforms. More specifically, this disclosure pertains reusable, interlockable composite bamboo industrial mats that are relatively simple to manufacture and deploy.

BACKGROUND

Industrial mats are generally used to provide a flat, stable surface for supporting heavy equipment thereon. There are a number of different types of industrial mats. For example, access mats may be used to form temporary roadways to provide heavy equipment access to remote areas that would be otherwise be inaccessible due to poor ground conditions. As another example, crane mats may be used to provide a temporary, stable foundation for assembling and using thereon a crane.

Conventional industrial mats are typically manufactured from hardwood, metal, or combinations thereof. These materials, however, have a number of drawbacks. For example, hardwood is prone to breakages, retains about 30% moisture after rainfalls (which causes corresponding increases in weight), is susceptible to damage caused by rot, insects, and fungi, and can be relatively slow to replenish after harvesting. While metals avoid some of the issues associated with the use of hardwood, metals that are sufficiently strong enough to be used in industrial mats are expensive and often heavier than hardwood, which, in turn, increases the costs of manufacturing and transporting the mats.

For example, referring to FIG. 1, there is shown a conventional industrial mat 10 comprising three layers of hardwood panels 12. The hardwood panels 12 are arranged to form a top layer 14, a bottom layer 16 (see FIG. 2), and an intermediate layer 18 (See FIG. 3). In general, each of the top layer 14, the bottom layer 16, and the intermediate layer 18 comprise four panels 12. As well, the panels 12 of the bottom layer 16 and the intermediate layer 18 have receiving notches 20 cut therein for receiving fingers 22 in order to interlock multiple industrial mats 10. As shown in FIG. 3, the fingers 22 are extraneous pieces of hardwood that are inserted between the bottom layer 16 and the intermediate layer 18 and between the intermediate layer 18 and the top layer 14.

The conventional industrial mat 10 shown in FIGS. 1 to 3 have similar problems as those described above for industrial mats that are made with hardwoods. As well, it is noted that the seams between the panels 12 of the first layer 14 and the bottom layer 18 are completely aligned with each other, which may weaken the industrial mat 10 therealong by providing a linear stress or fracture point. Further, while the fingers 22 are sandwiched between the layers 14, 16, and 18, there is still a risk that they are knocked loose from the industrial mat 10 during use—for example, when interlocked industrial mats 10 move relative to each other during use as temporary roadways. As well, because the thickness of the industrial mat 10 is generally constant therealong, portions of the bottom layer 16 and the intermediate layer 18 are removed to provide space for the fingers 22 to be inserted therein, as shown in FIG. 3. Such modifications to the panels 12 of the industrial mat 10 may be complex and expensive.

SUMMARY

Some embodiments of the present disclosure generally relate to interlocking elongate composite bamboo industrial mats comprising two or three laminated, secured together layers. Other embodiments relate to methods of making elongate composite bamboo panels that may be assembled to form the interlocking elongate composite bamboo industrial mats.

An embodiment disclosed herein, relates to a method of making an example interlocking elongate composite bamboo industrial mat from elongate bamboo poles. The method includes the steps of splitting harvested elongate bamboo poles into elongate linear bamboo strips and crushing the elongate linear bamboo strips to form elongate linear fractured bamboo strips. Once formed, the elongate linear fractured bamboo strips are steamed for a selected period of time and then dried to a moisture content of less than 10%. The dried elongate linear fractured bamboo strips are dipped into a glue tank, then suspended above the tank to allow excess glue to drain from the elongate fractured bamboo strips back into the tank. The glue-dipped elongate linear fractured bamboo strips are kiln dried at a temperature of about 120° C. to a moisture content of about 10% or less by wt. A plurality of kiln-dried glue-dipped elongate fractured bamboo strips are spread across the bottom surface of a hydraulic press to a selected thickness, and then compressed with a pressure selected from a range of 8 bars to 13 bars (800 kPa to 1,300 kPa) for about 1 hour while the temperature is maintained at about 120° C. to thereby form a compressed composite bamboo panel comprising glued elongate linear fractured bamboo strips. The compressed composite bamboo panel is cooled while remaining in the press for at least 24 hours after which, it may be cut into selected sizes of panels and boards.

According to an example of an embodiment disclosed herein, an interlocking composite bamboo industrial mat comprises a bottom layer, a top layer, and a sandwiched layer between the top and bottom layers. The top and bottom layers comprise a plurality of elongate composite bamboo panels arranged in parallel while the sandwiched layer comprises a plurality of elongate composite bamboo panels arranged perpendicular to the top and bottom layers. The industrial mat also comprises a plurality of fasteners for securing tightly securing together the bottom layer, the top layer, and the sandwiched layer wherein each fastener comprises a sleeve nut, a convex washer, and a bolt. According to one aspect, one end of the elongate interlocking composite bamboo industrial mat is provided with a plurality of spaced-apart fingers while the opposite end is provided with a plurality of matching spaced-apart receptacles configured to receive therein a plurality of spaced-apart fingers of another matching interlocking composite bamboo industrial mat. According to another aspect, the interlocking composite bamboo industrial mat may have a plurality of fingers extending outward from an elongate side edge while the opposite elongate side edge may have a matching plurality of receptacles configured to receive therein a plurality of spaced-apart fingers of another matching interlocking composite bamboo industrial mat. According to another aspect, the interlocking composite bamboo industrial mat is provided with two pairs of spaced-apart lifting assemblies along the opposing elongate sides of the mat.

The bottom layer generally comprises seven elongate boards cut from a compressed composite panel wherein the first board and the seventh board define the outside elongate sides of the bottom layer while the second, fourth, and sixth boards have the same widths and are positioned with their first ends protruding a selected distance beyond the first, third, fifth, and seventh boards to thereby form fingers while their opposite ends form receptacles that have a matching depth to the outward extending fingers. The second layer, also referred to as the sandwiched layer, comprises three to five panels or boards cut from compressed composite panels that have a length about equal to the width of the assembled bottom layer, and are laid on top of the bottom layer perpendicular to the elongate boards comprising the bottom layer. The top layer generally comprises two or three elongate panels that, when placed side-by-side on top of the middle layer, provide the same width as the bottom panel. The three layers are then securely engaged by a plurality of spaced apart 3-piece fasteners, wherein each fastener comprises a sleeve nut, a convex washer (also known in the art as a "dome washer"), and a bolt. The plurality of bolts are inserted into and through plurality of holes drilled through the three layers in a selected repeating patter. A convex outward-facing washer is slipped over each bolt which is then threadably and securely engaged by a sleeve nut. Two pairs of matching spaced-apart slots are cut into the elongate sides of the three-layered mats for installation thereinto of matching lifting assemblies.

BRIEF DESCRIPTION OF THE FIGURES

The embodiments of the present disclosure will be described with reference to the following drawings in which.

DETAILED DESCRIPTION

Figure 1:
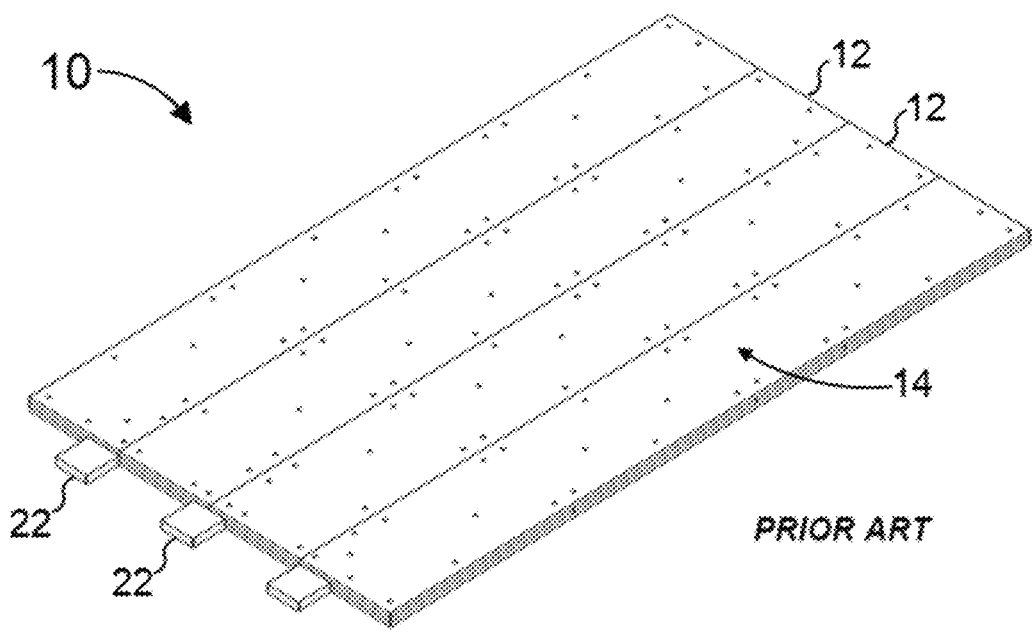
FIG. 1 is a top orthogonal view of a prior art conventional industrial mat.
Figure 2:
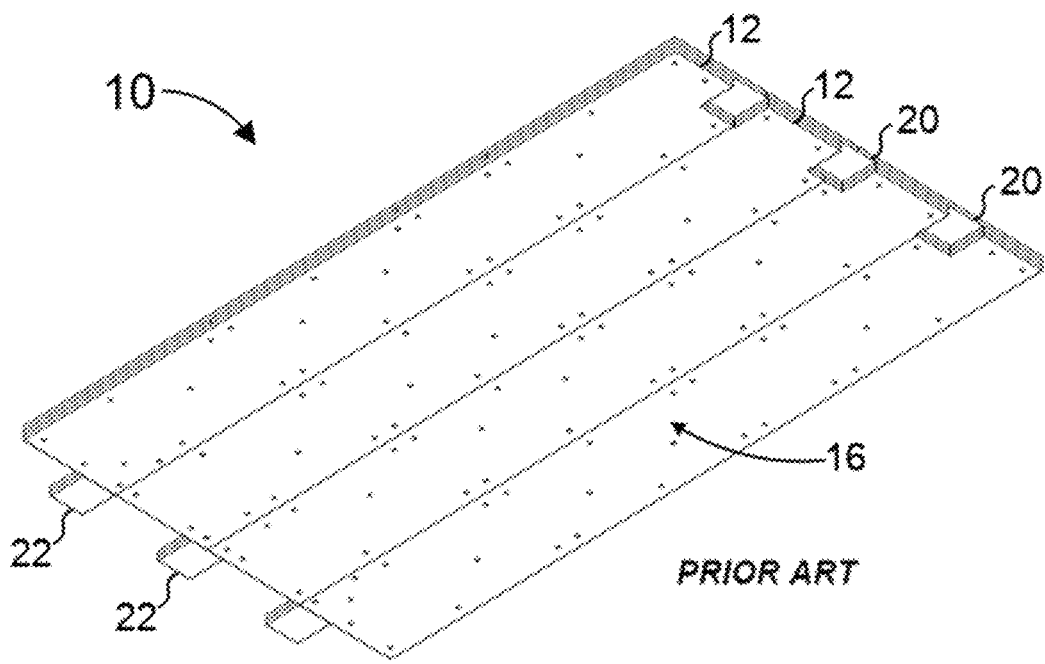
FIG. 2 is a bottom orthogonal view of the conventional industrial mat shown in FIG. 1.
Figure 3:
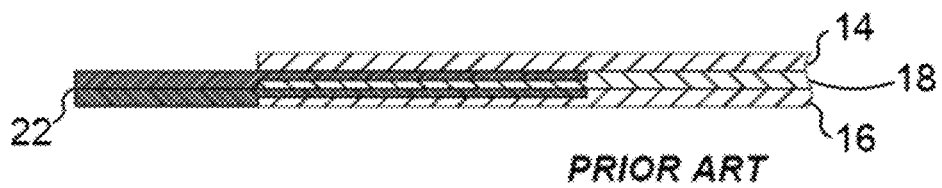
FIG. 3 is a cross-section of a finger of the conventional industrial mat shown in FIGS. 1 and 2.

The embodiments of the present disclosure generally relate to interlocking elongate industrial mats incorporating laminated composite bamboo panels therein and methods of making such interlocking elongate industrial mats.

Bamboo has numerous properties that make it well suited for use as a structural component for industrial mats. For example, unlike hardwood, bamboo is a type of grass that takes about three to about six years to mature. In contrast, it typically takes hardwood trees about 50 years to mature. As a result, after harvesting, bamboo plants may be replenished much more quickly than hardwood trees which, in turn, makes bamboo a considerably less expensive and more sustainable resource than hardwood. Further, bamboo is also substantially more resistant to damage caused by rot, insects, fungi, and the like, thereby providing industrial mats produced with bamboo greatly increased durability and longevity in comparison with hardwood industrial mats. Furthermore, bamboo is generally more flexible and resilient than hardwood and metal. Thus, when used in industrial mats, bamboo allows the industrial mats to bend and/or flex over uneven ground during use, which may reduce the likelihood of breakage. As well, bamboo may have a tensile strength stronger than that of metals commonly used in industrial mats such as steels.

However, while bamboo has numerous desirable properties, the use of bamboo as a component of industrial mats is conventionally avoided due at least in part to the complexities involved in processing bamboo into useable forms. In more detail, bamboo grows in generally hollow, uneven cylinders that are difficult to process into flat surfaces. That is, unlike hardwood, bamboo cannot simply be harvested and cut into flat boards for subsequent use in industrial mats.

In spite of the above challenges, the inventors developed a relatively simple and inexpensive method for processing bamboo poles into durable elongate composite panels consisting compacted elongate fractured bamboo strips and glue, and devoid of air spaces. The elongate composite bamboo panels may then be cut into elongate composite bamboo boards that may then be laminated and secured together to form interlocking industrial mats that are suitable for supporting thereon heavy industrial rolling equipment and stationary equipment. The interlocking industrial mats are relatively light in comparison to hardwood and/or metal industrial mats, are easily handed and transported, but are very flexible, resilient, and durable.

According to some embodiments of the present disclosure, the interlocking industrial mats preferably comprise three layers of elongate composite bamboo panels and/or boards wherein the elongate fractured bamboo strips in the panels and boards comprising the top and bottom layers are in parallel while the elongate fractured bamboo strips in the panels and boards comprising the middle layer are perpendicular to the top and bottom layers. According to other embodiments, the industrial mats disclosed herein may comprise two layers of elongate composite bamboo panels wherein the elongate fractured bamboo strips comprising the bottom layer are perpendicular to the elongate fractured bamboo strips comprising the top layer. The two-layered and three-layered laminated industrial mats of this disclosure are secured together with a plurality of fasteners wherein each fastener comprises a sleeve nut, two concave outward-facing washers (also known in the art as "dome washers"), a bolt that is threadably engageable with the sleeve nut. If so desired, sleeve anchor nuts may be used in place of sleeve nuts. The assembly/lamination of the elongate composite bamboo panels and boards with the elongate strips in perpendicular orientation in the adjacent layers and then securing the laminated layers together with the plurality of fasteners provides great flexibility and resilience to the interlocking industrial mats. When heavy rolling industrial equipment such as tractor trailer trucks, tandem dump trucks, excavators, bulldozers, cranes, and the like, are driven across a temporary and portable roadway assembled with the interlocking elongate industrial mats comprising laminated composite bamboo boards and panels, the industrial mats are sufficiently flexible to deform downward in response to the weight pressures from the rolling industrial equipment and as the equipment rolls past each of the interlocked industrial mats, the resilience of the laminated composite elongate bamboo industrial mats will return to their resting flat shape. The flexing and resilience movements of the laminated composite elongate bamboo industrial mats are facilitated by movement of the threadably engaged nuts of the plurality of fasteners about and against the outward-facing concave washers in response to deformation of the interlocking laminated composite elongate bamboo industrial mats.

An embodiment of the present disclosure pertains to a method of making an elongate composite bamboo panel from harvested bamboo poles. The method generally comprises splitting a plurality of elongate bamboo poles with a hydraulic press into pluralities of elongate bamboo pole strips. The pluralities of elongate bamboo pole strips are then crushed with a hydraulic press to form pluralities of elongate fractured bamboo strips having asymmetrical cross-sections. Selected pluralities of the crushed elongate fractured bamboo strips are steamed and then dried to a moisture content of about 10% or less. A thermoset fluid adhesive is then applied to a selected plurality of dried elongate fractured bamboo strips by dipping the plurality of dried elongate fractured bamboo strips into a glue tank, then removing the plurality of dried elongate fractured bamboo strips from the glue tank and suspending the dipped elongate fractured bamboo strips above the glue tank to allow excess glue to drip down the lengths of the suspended elongate fractured bamboo strips and back into the glue tank to thereby produce a plurality of adhesive-coated elongate fractured bamboo strips.

A selected plurality of adhesive-coated elongate fractured bamboo strips is then placed onto the bottom surface of a hydraulic press and heated to a temperature of about 120° C. after which, a selected compressive pressure is applied by the top surface of the press for about 60 min to thereby form a compressed elongate composite bamboo panel having a selected thickness. The compressed elongate composite bamboo panel is then cooled for about 24 h to ambient temperatures while remaining compressed under pressure in the hydraulic press. Depending on geographical location, ambient temperatures may range from 15° C. to 35° C.

After cooling has been completed, the elongate composite bamboo panel may be further processed by sawing to produce therefrom elongate composite bamboo boards having selected lengths and widths and/or smaller elongate composite bamboo panels having selected lengths and widths.

Suitable bamboo poles for processing with the methods disclosed here are preferably harvested from bamboo plantations that are at least 2.5 years old so that the bamboo plants are of a sufficient height to provide lengths of poles suitable for use to form the panels of the industrial mats of the present disclosure. In general, lengths of poles of about 1.2 m to about 4.0 m or longer are suitable for use with the methods disclosed herein. For example, the bamboo poles may be cut into 1.3 m sections, 2.5 m sections, 3 m sections, 3.65 m sections (about 4 ft, 8 ft, 10 ft, 12 ft sections) for further processing.

Suitable elongate bamboo poles harvested from younger bamboo plantations typically have diameters from a range of about 1 cm to about 5 cm (about 0.5 in to about 2 in). According to one aspect, small-diameter elongate bamboo poles may be fractured into elongate bamboo strips having asymmetrical cross-sections using a hydraulic press with pressures from a range of about 800 kPa to about 1300 kPa. Larger-diameter bamboo poles harvested from older plantations may have diameters ranging from about 5 cm to about 15 cm (about 2 in to about 6 in) or larger. According to another aspect, such larger-diameter bamboo poles may be split into 3 or 4 or 5 or 6 or 8 elongate bamboo strips using hydraulic bamboo pole splitters. A suitable width for an elongate split bamboo strip is in a range of about 1 cm or less to about 6 cm. The elongate split bamboo strips may then be fractured elongate bamboo strips having asymmetrical cross-sections by crushing using a hydraulic press using a pressure selected from a range of about 800 kPa to about 1300 kPa. Regardless of whether elongate bamboo strips are produced by crushing or splitting, the crushing step may be repeated one or more times to produce suitable elongate fractured bamboo strips having asymmetrical cross-sections.

The elongate fractured bamboo strips are then steamed using suitable industrial-scale steaming facilities and equipment. For example, the elongate fractured bamboo strips may be loaded onto rolling carts and then transported into steaming equipment that is sized to receive and steam therein pluralities of rolling carts. The steaming steps provides certain desired properties to the elongate fractured bamboo strips. For example, steaming may eliminate unwanted pests such as insects and microorganisms from the fractured bamboo strips. Steaming may also remove soil and plant debris and litter from about the elongate fractured bamboo strips, leaving behind voids that may be filled with adhesive. The steaming step may be performed for about 2 hours to about 4 hours. The steam pressure used may be about 200 kPa to about 400 kPa. For example, the fractured bamboo strips may be steamed for about 3 hours under a pressure of about 350 kPa.

The fractured bamboo strips are then dried to remove the residual moisture content resulting from the steaming process. In general, the fractured bamboo strips are dried to a moisture content of less than about 10% wt/wt. The drying may be done under ambient conditions or in a suitable industrial dryer or a combination thereof. For example, the fractured bamboo strips may be dried under ambient conditions for a first period of time, and then moved into to an industrial kiln drier for a second period of time to lower the moisture content to about 10% wt/wt or less. If using an industrial kiln dryer, the temperature therein may be about 60° C. to about 80° C. The steamed and dried elongate fractured bamboo strips are cooled to ambient temperatures for at least about 10 hrs. Depending on geographical location, ambient temperatures may range from 15° C. to 35° C. It may be useful cool the dried elongate fractured bamboo strips in a dehumidified environment to avoid increasing the moisture content of the fractured bamboo strips. However, if the environment is not dehumidified, the fractured bamboo strips may be wrapped in a moisture-proof material to maintain the moisture content thereof at about 10% wt/wt or less.

The cooled elongate fractured bamboo strips may then be coated with an adhesive by submersing a selected plurality of the bamboo strips into a glue tank containing therein a selected fluid adhesive, for a period of time sufficient to allow the adhesive to penetrate the fractured bamboo strips. For example, the elongate fractured bamboo strips may be submerged within the fluid adhesive for a period of time selected from about 5 minutes to about 15 minutes. The selected fluid adhesive may be a thermosetting fluid adhesive. An example of a suitable fluid adhesive is resole phenolic resins such as PREFERE® 95 5563U available from distributers of products produced by Prefere Resins Germany GmbH (PREFERE is a registered trademark of Prefere Resins Holding GmbH, Erkner, FRG). After submersion for the selected period of time, the adhesive-coated elongate fractured bamboo strips are removed from and suspended above the glue tank to allow excess adhesive to flow by gravity down from the adhesive-coated elongate fractured bamboo strips back into the tank. The adhesive-coated elongate fractured bamboo strips may be suspended above the glue tank for a period of time selected from about 10 min to about 30 min.

Then, the adhesive-coated elongate fractured bamboo strips are dried to reduce their moisture content to about 10% wt/wt or less. Depending on the type of fluid adhesive the elongate fractured bamboo strips were coated with, the drying may be done in an industrial kiln drier at a temperature selected from a range of about 35° C. to about 55° C.

Figure 4:
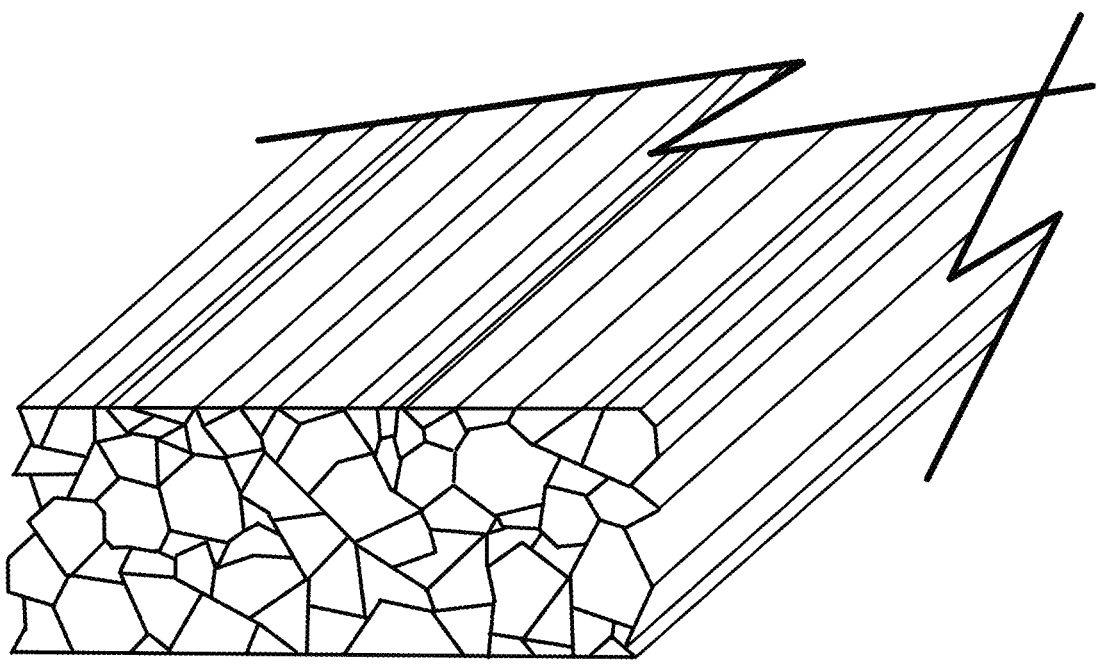
FIG. 4 is an orthogonal view of a partial length of an interlockable elongate composite bamboo panel produced with an example method disclosed herein.

Pluralities of adhesive-coated elongate fractured bamboo strips may then be compressed into elongate composite bamboo panels with a flatbed hydraulic press configured to produce an elongate panel having length selected from a range of about 2.0 m to about 5.0 m (about 6.5 ft to about 16.5 ft) and therebetween, a width selected from a range of about 1.0 m to about 3.0 m (about 3.25 ft to about 10 ft) and therebetween, and a thickness selected from a range of about 12.5 mm to about 37.5 mm (about 0.5 in to about 1.25 in) and therebetween. Beds of suitable flatbed hydraulic presses typically are configured to demountable engage therewith bolsters that are provided with pluralities of upward-facing orifices to receive therein pegs on the bottom surfaces of end stops and side stops (sometimes referred to by those skilled in this art, as a "bolster"). Pairs of opposing spaced-apart end stops may be demountably engaged with the bolster to provide a selected length therebetween. Pairs of opposing spaced-apart side stops may be demountably engaged with the bolster to provide a selected width therebetween. The hydraulic press may be configured so that the ram (that is, the upper moving surface of the hydraulic press providing the compressive force against the bolster) may be provided with a bottom stop so that the downward travel of the ram is stopped when a selected pressure has been applied after which, the ram is retracted upward to its resting position. It is to be noted that the hydraulic press may be configured to deliver a selected pressure at a height above the bolster selected from a range of about 12.5 mm to about 37.5 mm (about 0.5 in to about 1.25 in) and therebetween. The hydraulic press may be configured to produce a maximum pressure at the selected height above the bolster, in a range from about 8 kPa to about 1300 kPa. The hydraulic press may be configured to remain at the selected maximum pressure at the selected height above the bolster for a period of time selected from a range of about 10 min to about 60 min. It should be noted that, depending on the type of thermoset fluid adhesive selected, a selected plurality of adhesive-coated elongate fractured bamboo strips should be heated to and maintained at the temperature at which the adhesive sets or cures or crosslinks. For example, if a fluid phenol-formaldehyde resin is used for coating elongate fractured bamboo strips, the adhesive-coated elongate fractured bamboo strips may be heated to and maintained at 120° C. during compression in and by the flatbed hydraulic press. After the selected compression time period has been reached, the ram is released and returned to its resting position, the elongate composite bamboo panel is removed from the flatbed hydraulic press and then cooled under ambient conditions for at least about 24 hr. Depending on geographical location, ambient temperatures may range from 15° C. to 35° C. The elongate composite bamboo panels produced as disclosed herein typically have flat and parallel top and bottom surfaces and well-defined ends. However, their side edges typically are not linearly perpendicular to the top and bottom surfaces (FIG. 4). Accordingly, after the elongate composite bamboo panels have cooled to ambient temperature, it is appropriate to trim their side edges to provide linearly perpendicular side edges relative to the top and bottom surfaces of the panels and to provide opposing side edges that are parallel to each other. It is also appropriate to trim the ends of the panels so that the opposing ends are parallel to each other.

Figure 5:
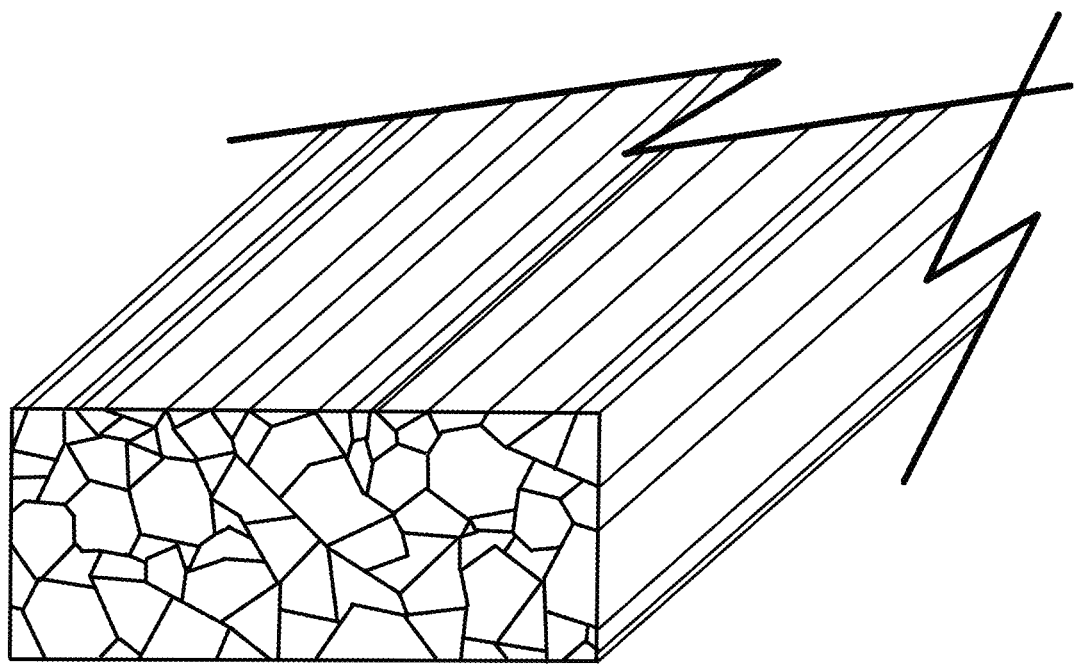
FIG. 5 is an orthogonal view of the elongate composite bamboo panel shown in FIG. 4 after its side edges have been trimmed to provide perpendicular surfaces to the top and bottom surfaces.

It is to be noted that the process of crushing and fracturing the elongate bamboo strips produces fractured bamboo strips having much larger exposed fractured surface areas on a linear base in comparison with the surface areas of the side edges of elongate bamboo strips produced from split bamboo poles by repeated sawing with circular saw blades or band saw blades. As a result, compressed elongate composite bamboo panels comprising adhesive-coated elongate fractured bamboo strips having asymmetrical cross-sections (FIGS. 4, 5) produced as disclosed herein, absorb, adhere, and retain substantially more adhesive than will elongate bamboo strips having linear straight edges produced by sawing, and when compressed together under pressure as disclosed herein, will produce a more durable and wear-resistant compressed elongate composite bamboo panel.

According to another embodiment of the present disclosure, a compressed elongate composite bamboo panel suitable for producing the interlocking laminated composite elongate bamboo industrial mats disclosed herein, may have (i) lengths selected from a range of about 2.0 m to about 5.0 m (about 6.5 ft to about 13 ft) and therebetween, (ii) widths selected from a range of about 1.0 m to about 3.0 m (about 3.25 ft to about 10 ft) and therebetween, and (iii) thicknesses selected from a range of about 12.5 mm to about 37.5 mm (about 0.5 in to about 1.25 in) and therebetween. A particularly suitable laminated composite elongate bamboo layer may have dimensions of 3.9 m long, 1.1 m wide, and 20 mm thick. If so desired, the compressed elongate composite bamboo panels may be sawn lengthwise to produce two or three or four or more elongate subpanels. Sawn subpanels that have widths of about 0.3 m (12 in) or less, for example 25.4 cm (10 in), 20.3 cm (8 in), 15.2 cm (6 in), 10.2 cm (4 in), 5.1 cm (2 in), and therebetween, may be referred to herein as compressed elongate composite bamboo boards.

As used herein, the term "industrial mat" refers to a product for providing temporary, stable flat surface for support of heavy stationary or mobile industrial equipment. For example, the industrial mats disclosed herein may be used to enable and support the transit of heavy earthmoving equipment, dump trucks, tractor trailers and the like over unstable and/or uneven terrain. It is noted that the term "industrial mat" is intended to encompass all types of industrial mats, elongate composite bamboo including without limitation, access mats, crane mats, rig mats, and the like.

The industrial mats according to embodiments disclosed herein generally comprise a plurality of layers of tightly and securely engaged together compressed elongate composite bamboo panels wherein each layer has a plurality of elongate composite bamboo subpanels that comprise compressed elongate bamboo strips in a parallel orientation, and wherein the plurality of compressed elongate bamboo strips in a first layer of elongate composite bamboo subpanels are in a perpendicular orientation to a plurality of composite bamboo subpanels in a second layer. Accordingly, such elongate composite bamboo industrial mats may be referred to as laminate composite bamboo industrial mats. Each layer of compressed elongate bamboo panels may comprise (i) a pair of subpanels that have identical lengths and widths, and/or (ii) three subpanels that have the same lengths but have different widths, and/or (iii) four or more subpanels that have the same lengths but have different widths. Each of the subpanels generally comprises compressed glued-together elongate fractured bamboo strips that extend from one end to the other end of the subpanel. The industrial mats comprising multiple layers of bolted together elongate composite bamboo panels produced as disclosed herein, may be heavier and have greater densities than comparably sized industrial mats made with hardwood and/or softwood boards and panels.

According to an aspect, a two-layer laminate elongate composite bamboo industrial mat may comprise a top layer of two or more elongate composite bamboo subpanels, each having an identical length that defines the length of the industrial. The bottom layer may comprise a plurality of elongate composite bamboo subpanels with their compressed elongate bamboo strips positioned perpendicular to the top layer of elongate composite bamboo subpanels.

According to another aspect, a three-layer laminate elongate composite bamboo industrial mat may comprise a top layer of two or more elongate composite bamboo subpanels and a bottom layer of three or more elongate composite bamboo subpanels, each having an identical length that defines the length of the industrial mat and having their elongate bamboo strips in a parallel orientation. The middle layer, also referred to herein as an intermediate layer, may comprise a four or more elongate composite bamboo subpanels with their compressed elongate bamboo strips positioned perpendicular to the top and bottom layers of elongate composite bamboo subpanels. It is to be noted that the joints of the adjacent elongate composite bamboo subpanels selected for the top layer should not directly align with any of the joints of the elongate composite subpanels selected for the bottom layer but instead, the joints for the two or more elongate composite bamboo subpanels of the top layer should overlap the joints of the three or elongate composite bamboo subpanels of the bottom layer. This form of asymmetric alignment of the joints of the elongate composite bamboo subpanels of the top layer, intermediate layer, and bottom layer of the three-layer elongate composite bamboo industrial mat provides resilience and durability for supporting heavy rolling and stationary industrial equipment.

The multi-layer elongate composite bamboo industrial mats disclosed herein may have lengths from a range of about 2.5 m to about 5.0 m (about 8 ft to about 16.4 ft) and therebetween, widths from a range of about 1.0 m to about 2.0 m (about 3.25 ft to about 6.5 ft) and therebetween, and thicknesses from a range of about 37.5 mm to about 76 mm (about 1.5 in to about 3 in) and therebetween. A particularly suitable interlockable composite bamboo industrial mat may have dimensions of 3.9 m long, 2.2 m wide, and 60 mm thick (12.8 ft long, 7.2 ft wide, 2.5 in thick).

As used herein, the term "bottom layer" refers to the layer of the industrial mat that is closest to or in contact with a ground surface, while the term "top layer" refers to the layer of the industrial mat that will be in contact with, for example, heavy equipment travelling thereover. According to some aspects, some industrial mats according to this disclosure may comprise one or more middle layers sandwiched between the top and bottom layers.

According to one aspect, one end of the laminated elongate composite bamboo industrial mat may be provided with a plurality of fingers extending outward therefrom, for example two fingers, three fingers, four fingers, while the opposite end may be provided with a matching number of receptacles extending thereinto. Accordingly, two or more similarly configured laminated elongate composite bamboo industrial mat may be interlocked together by positioning the fingers of a first composite bamboo industrial mat into the receptacles of a second composite bamboo industrial mat. Accordingly, temporary roadways can be quickly assembled over unstable and/or uneven terrain by interlocking together a selected number the laminated elongate composite bamboo industrial mats by inserting the fingers extending from one end of a first mat into the matching receptacles of a second mat and then repeating the interlocking engagement with the ends of additional laminated elongate composite bamboo industrial mats until the desired length of the portable road way has been reached or alternatively, when the desired surface area has been covered.

According to another aspect, one elongate side of the laminated elongate composite bamboo industrial mat may be provided with a plurality of fingers extending outward therefrom, for example two fingers, three fingers, four fingers, while the opposite elongate side may be provided with a matching number of receptacles extending thereinto. Accordingly, two or more similarly configured laminated elongate composite bamboo industrial mat may be interlocked together by positioning the fingers of a first composite bamboo industrial mat into the receptacles of a second composite bamboo industrial mat. Accordingly, temporary roadways can be quickly assembled over unstable and/or uneven terrain by interlocking together a selected number the laminated elongate composite bamboo industrial mats by inserting the fingers extending from one elongate side of a first mat into the matching receptacles of an elongate side of a second mat and then repeating the interlocking engagement with the elongate of additional laminated elongate composite bamboo industrial mats until the desired length of the portable road way has been reached or alternatively, when the desired surface area has been covered.

Reference will now be made in detail to example embodiments of the laminated elongate composite bamboo industrial mat according to this disclosure, wherein numerals refer to like components, examples of which are illustrated in the accompanying drawings.

Referring now to FIGS. 6 to 10, there is shown a laminated elongate composite bamboo industrial mat 100 according to an embodiment of the present disclosure. The laminated elongate composite bamboo industrial mat 100 comprises a top layer 110, an intermediate layer 130, and a bottom layer 120 (FIGS. 6, 7, 8) that are secured together using a plurality of fasteners 140 in a repeating design. Also shown are lifting elements 102, which enable and facilitate the lifting, maneuvering, and moving about of the industrial mat 100 by equipment such as cranes, forklifts, excavators, backhoes, and the like.

Figure 6:
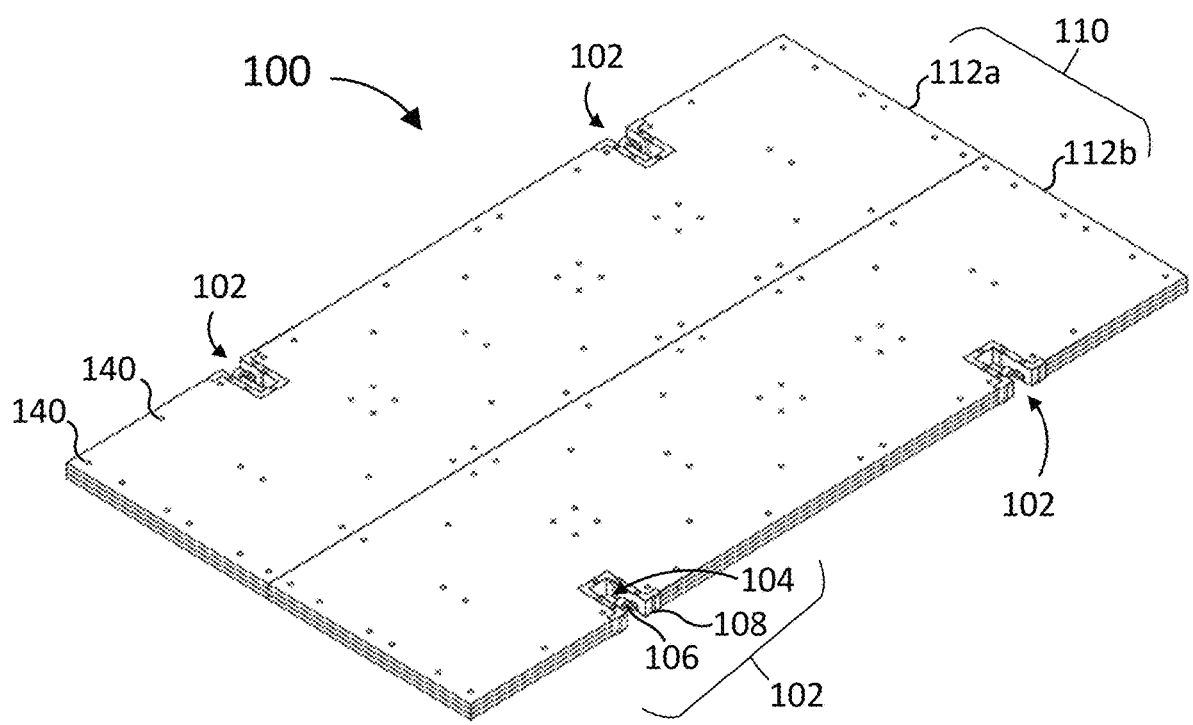
FIG. 6 is a top orthogonal view of a composite bamboo industrial mat according to an embodiment of the present disclosure.
Figure 7:
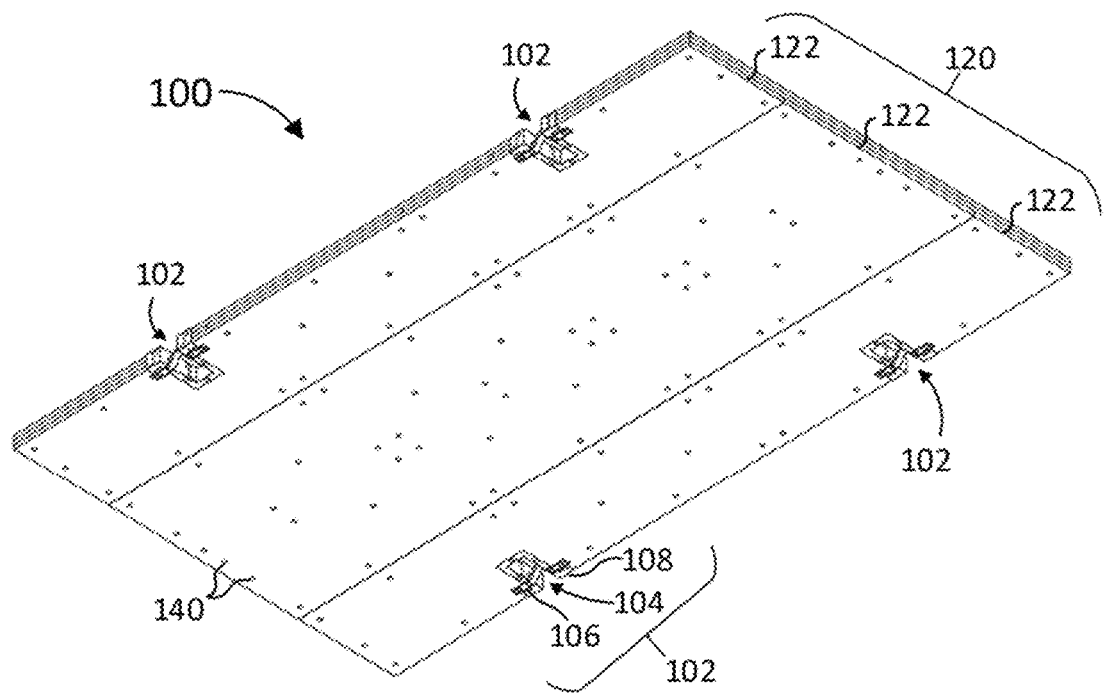
FIG. 7 is a bottom orthogonal view of the composite bamboo industrial mat shown in FIG. 6.
Figure 8:
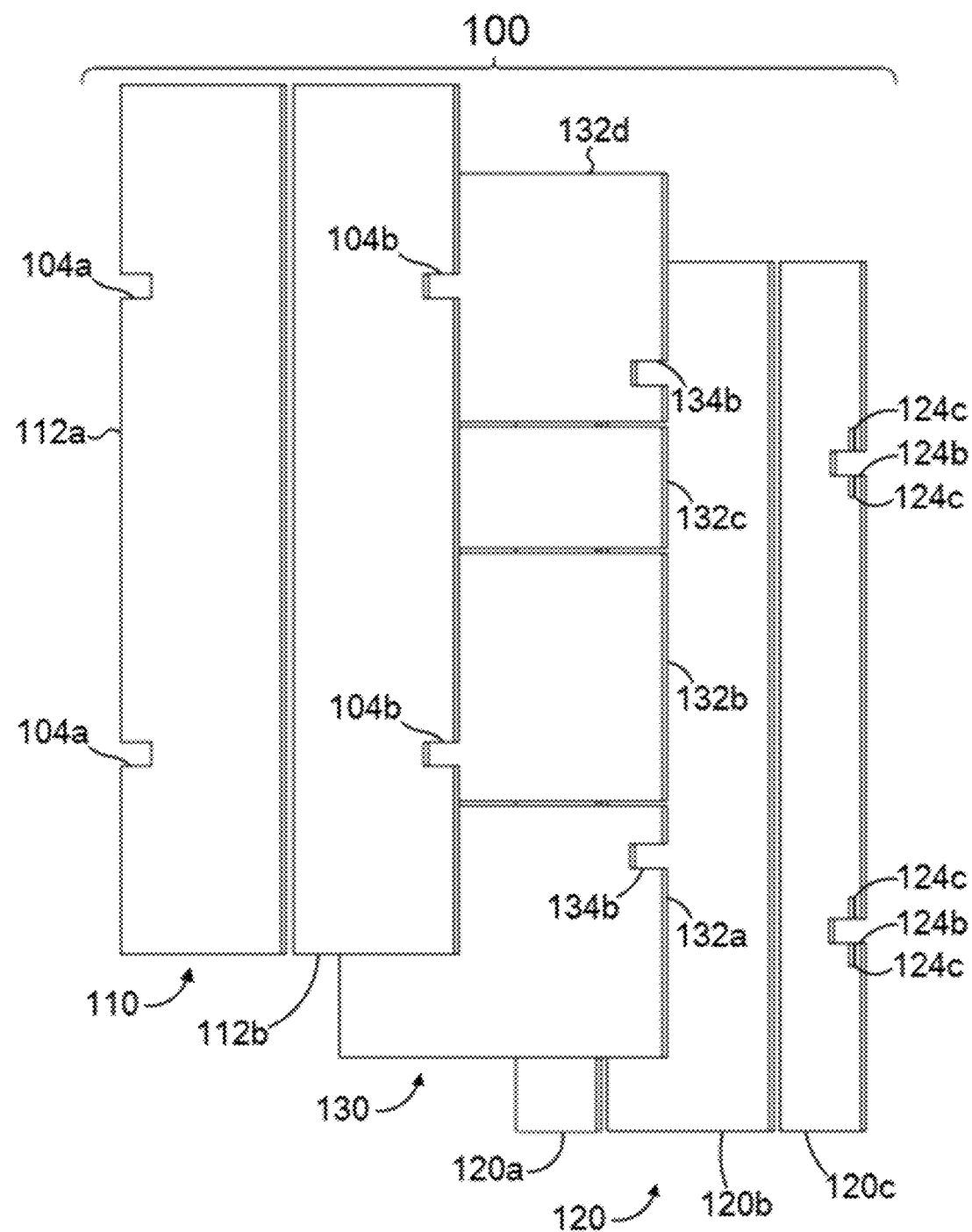
FIG. 8 is an exploded top-down view of the composite bamboo industrial mat shown in FIGS. 6 and 7.

Each of the layers 110, 120, 130 comprises a plurality of elongate composite bamboo panels. In this example, the top layer 110 is provided with a pair of matching elongate composite bamboo panels 112a, 112b (FIGS. 6, 8). The bottom layer 120 is provided with three elongate composite bamboo panels 120a, 120b, 120c in parallel to the top panels 112a, 112b (FIGS. 7, 8). The intermediate layer 130 is provided with a four elongate composite bamboo panels 132a, 132b, 132c, 132d wherein the elongate fractured and glued-together bamboo strips are perpendicular to the glued-together bamboo strips in the top panels 112a, 112b, and bottom panels 120a, 120b, 120c (FIG. 8)

As previously described herein, the elongate composite bamboo panels selected for layers 110, 120, 130 may be sized and shaped differently from layer to layer. For example, as shown in FIGS. 6 to 8, top layer 110 is provided with two elongate composite bamboo panels, bottom layer 120 is provided with three elongate composite bamboo panels, while intermediate layer 130 is provided with four elongate composite bamboo panels. However, the number of elongate composite bamboo panels selected for each of the layers 110, 120, 130 may be two or three or four or five or six or more. Using differently widths of elongate composite bamboo panels for each of layers 110,120,130 misaligns the overlapping seams of each layer 110, 120, 130 and thereby provides additional structural strength and durability to the laminated elongate composite bamboo industrial mat 100.

In general, the laminated elongate composite bamboo industrial mat 100 may have a length of about 2 m to about 3 m and a length of about 3 m to about 4 m. Thus, the laminated elongate composite bamboo industrial mat 100 may have a surface area of about 6 $m^2$ to about 12 $m^2$ and the panels 112, 122, 132 may be sized accordingly to provide such a surface area. The industrial mat 100 may also have an overall thickness of about 5 cm to about 10 cm. It is suitable for each of the layers 110, 120, 130 to have the same thickness. However, different layers may have different thicknesses if so desired.

In some embodiments, the laminated elongate composite bamboo industrial mat 100 may further comprise a plurality of lifting elements 102 to facilitate the lifting, maneuvering, installing, and removal of the industrial mats using equipment such as cranes, forklifts, excavators, backhoes, and the like. It is preferable that the laminated elongate composite bamboo industrial mat 100 are provided with two spaced apart matching pairs of lifting elements 102 as illustrated in FIGS. 6, 7. However, more or fewer lifting elements 102 may be provided if so desired.

Figure 9:
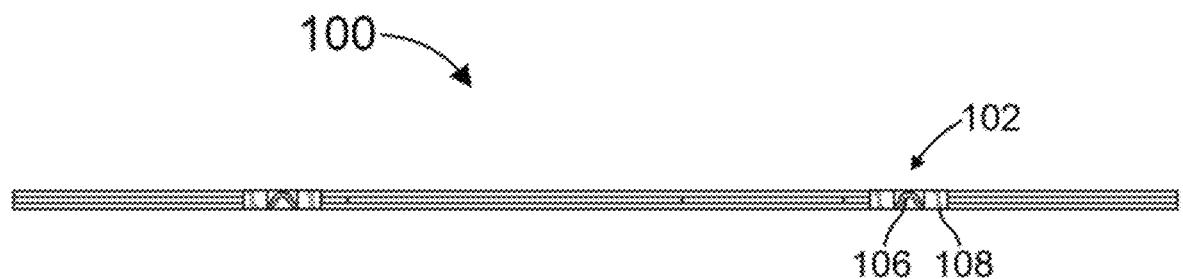
FIG. 9 is a side view of the composite bamboo industrial mat shown in FIGS. 6 to 8.
Figure 10:
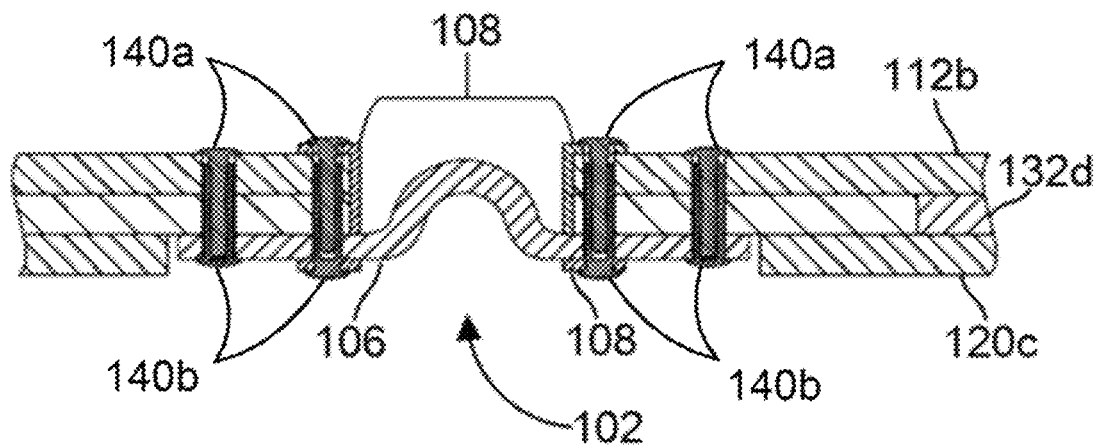
FIG. 10 is a cross-section of a lifting element of the composite bamboo industrial mat shown in FIGS. 6 to 9.

As shown in the laminated elongate composite bamboo industrial mat 100 illustrated in FIGS. 6 to 10, each of the lifting elements 102 is configured for demountable engagement into notches 104b, 124b,134b provided into the elongate composite bamboo panels 110b, 120c, 132d (FIG. 8). Each elongate composite bamboo panel selected for the bottom layer into which a notch 124b has been provided (FIG. 8; panels 132a, 132d) is additionally provided with two opposing channels 124c extending sideways therefrom, for receiving and housing therein the opposing ends of a hookable member 106. Each lifting element 102 is installed by inserting a lifting element framework 108 into a notch FIGS. 6, 7, 9, 10). The lifting element framework 108 comprises a three-sided channel structure with outward-extending flanges at the top and bottom of the framework 108. Each pair of the outward-extending flanges of each of the three sides is provided with a bore therethrough sized to receive therethrough a selected fastener 140, The distance between the upper and lower outward-extending flanges of the lifting element framework 108 is selected to slidingly receive and engage therein the top, intermediate, and bottom layers comprising the laminated elongate composite bamboo industrial mat 100. Prior to the sliding engagement of a lifting element framework 108 into and with a notch provided therefore in the laminated elongate composite bamboo industrial mat 100, the opposing ends of a hookable member 106 may be placed into a pair of the opposing channels 124c. After the hookable member is installed into the opposing channels 124c of the bottom layer, panels making up the middle and top layers of the industrial mat are placed onto the bottom layer such that the notches 104b, 124b, 134b are aligned. The lifting element framework 108 is then slid into and engaged with the notch, and then tightly secured in place with three bolts 140a inserted downward through the bores provided therefor in the upper outward-extending flanges of the three-sided lifting element framework 108, through bores provided therefore in the panels making up the middle and top layers of the industrial mat adjacent to the notch, through bores provided therefor in the hookable member 106, through bores provided therefore in the lower outward-extending flanges of the three-sided lifting element framework 108, and then secured in place by threadable engagement with sleeve nuts 140b (FIG. 10). Then, a fastener 140a is inserted through second bores provided therefor in the panels making up the middle and top layers of the industrial mat adjacent to the notch, and through a second bore provided therefor near one end of the hookable member 106, to additionally secure the hookable member in place with sleeve nuts 140b (FIG. 10). It is to be noted that the fasteners 140 used to secure the three-sided lifting element framework 108 in place did not include convex or dome washers.

The hookable members 106 may be formed of any suitable material that is capable of supporting the weight of the industrial mat 100 thereon. In more detail, the hookable members 106 may be a rigid member or a flexible member. If a rigid member, the hookable member 106 may be formed of a metal such as steel, an aluminum alloy, or the like. If a flexible member, the hookable member 106 may be formed of woven textile, a rope-like material, leather, or the like. Further, the hookable members 106 may be shaped to facilitate its hooking by equipment such as cranes and the like. For example, as shown in FIG. 9 and FIG. 10, the hookable members 106 may be arced when extending across the notch 104. Such configurations may make it easier for the hook of, for example, a crane to hook around the hookable members 106. It is noted that, if the hookable members 106 are rigid members, the material used to form the hookable members 106 may be precast to the desired shape, whereas, if the hookable members 106 are flexible members, the length of material used to form the hookable members 106 may be selected such that an arc or arc-like shape is formed when the hookable members 106 extend across the notches 104.

It is to be noted that the dimensions of the elongate composite bamboo panels making up the top and bottom parallel layers of the industrial mats are purposely asymmetrical. The intermediate layer comprises a plurality of asymmetrical elongate composite bamboo panels placed perpendicular to the top and bottom layers. The three layers are tightly secured together with a plurality of spaced apart fasteners 140 in a repeating pattern as illustrated in FIGS. 6, 7 such that each individual elongate composite bamboo panel receives therethrough and is secured to its overlying and underlying panels by 25 or more spaced-apart fasteners in repeating patterns. It is preferable that an industrial mat assembled as disclosed herein and having dimensions of 3.9 m long, 1.1 m wide, and 20 mm thick, is secured together with at least 100 spaced-apart fasteners in repeating patterns.

A particularly suitable fastener for securing together the laminated elongate composite bamboo industrial mat disclosed herein, comprises a bolt with an outward-facing concave washer slipped against the head of the bolt. After the bolt and outward-facing concave washer are inserted into and through the bores provided therefore in the outward-extending flanges of the lifting element framework and top, intermediate, and bottom layers of the industrial mat, a second outward-facing concave washer is slipped over the threaded end of the bolt, and then tightly secured together by threadable engagement with a sleeve nut that is drawn into the bores provided therefore in the outward-extending flanges of the lifting element framework and top, intermediate, and bottom layers of the industrial mat. Also suitable for threadable engagement with the bolt is a sleeve anchor nut.

It is to be noted that the use of fasteners comprising bolts, a pair of outward-facing concave washers positioned against the heads of the bolts and the heads of the sleeve nuts or sleeve anchor nuts enables the three secured together layers of elongate composite bamboo panels to resiliently deform under pressures exerted by rolling heavy equipment or stationary heavy equipment during operation, and then to remove to its unstressed resting position. It is to be noted that the outward-facing concave washers adjacent to the bolt heads and the sleeve nut heads enable the bolts to undergo a slight sliding movement in synchrony with the resilient deformation of the three secured together layers of elongate composite bamboo panels in response to heavy pressures, and then during return to an unstressed resting position.

Figure 11:
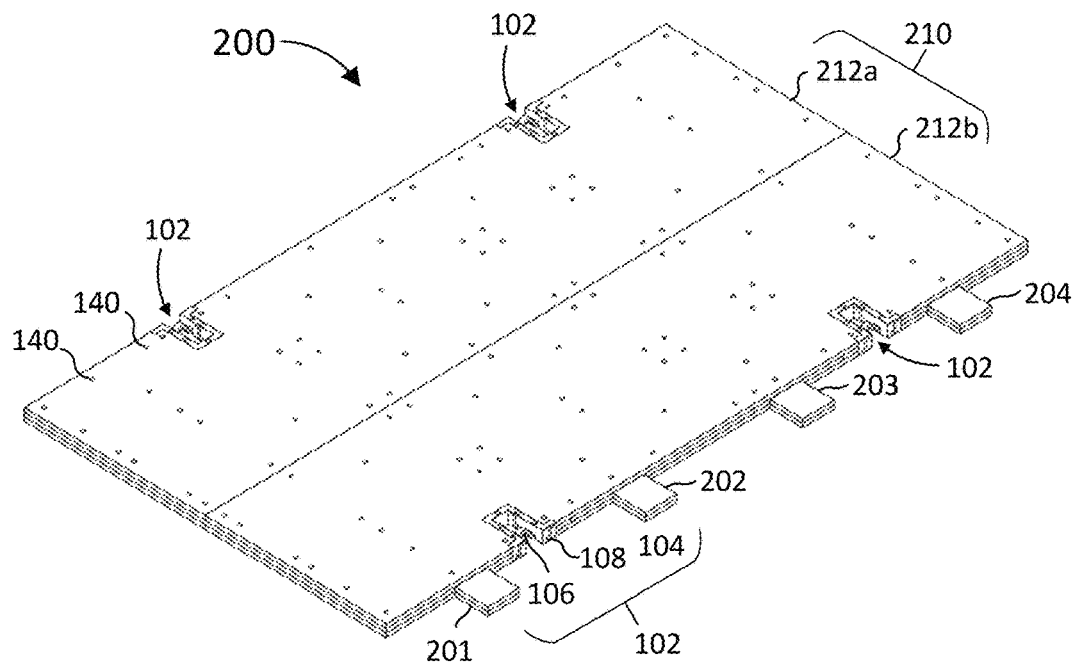
FIG. 11 is a top orthogonal view of a composite bamboo industrial mat according to another embodiment of the present disclosure.
Figure 12:
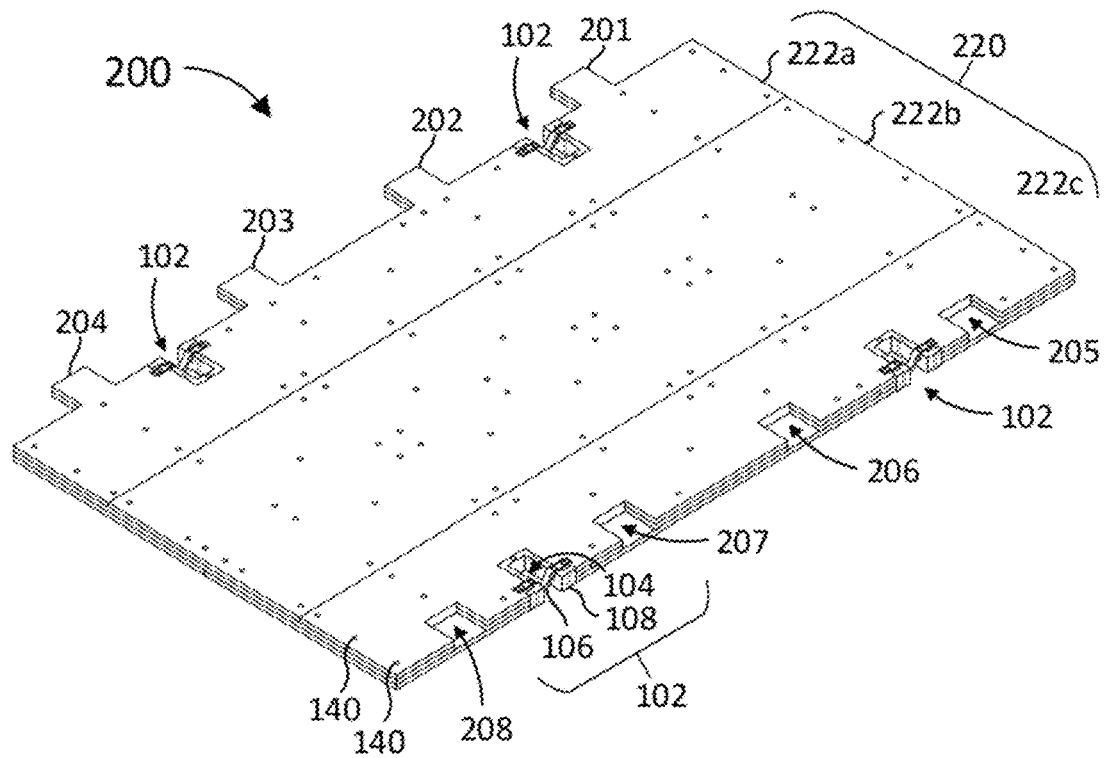
FIG. 12 is a bottom orthogonal view of the composite bamboo industrial mat shown in FIG. 11.
Figure 13:
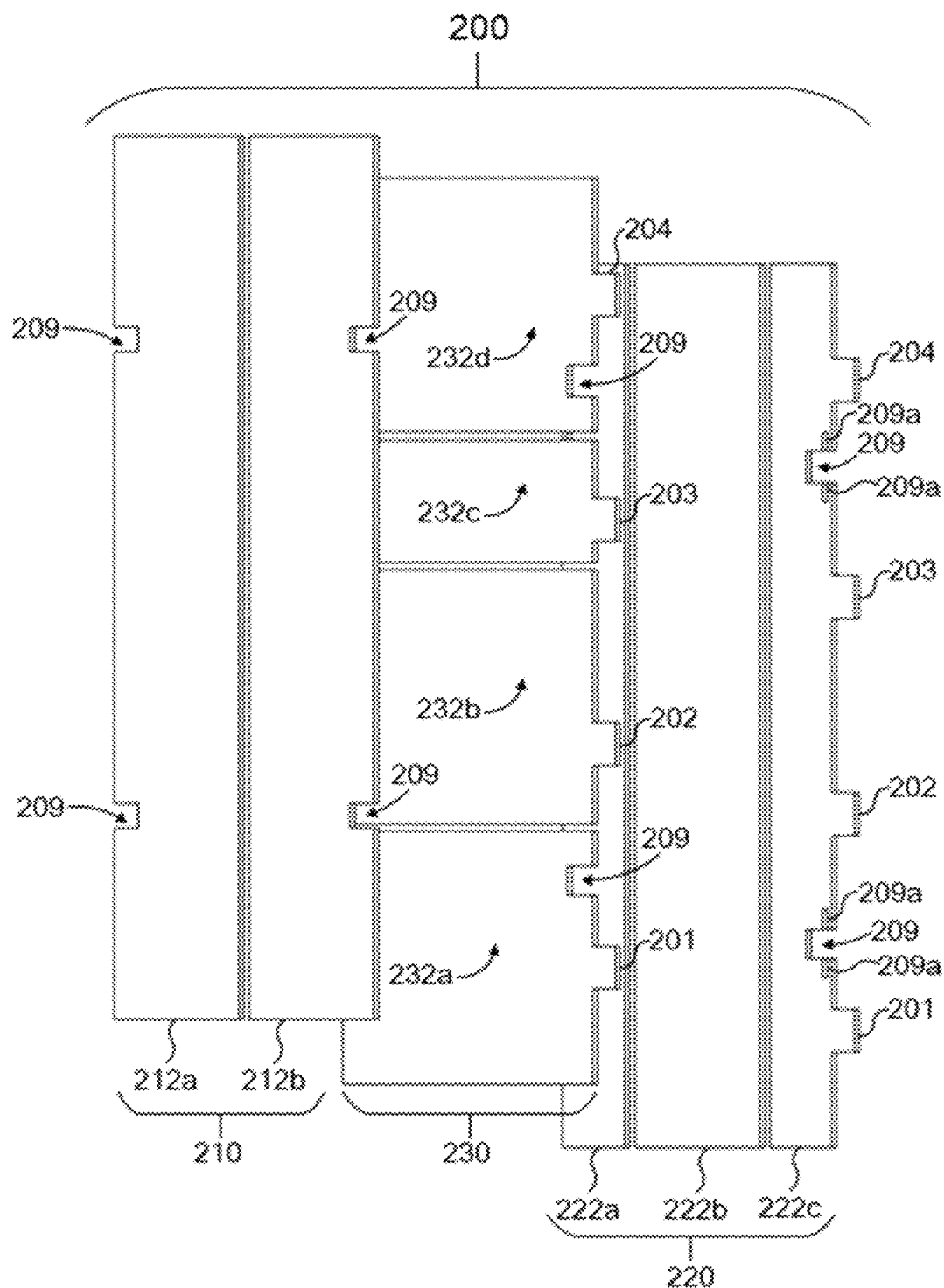
FIG. 13 is an exploded top-down view of the composite bamboo industrial mat shown in FIGS. 11 and 12.

An example embodiment of interlockable composite bamboo industrial mats disclosed herein is illustrated in FIGS. 11 to 13. The three-layer interlockable composite bamboo industrial mat 200 is provided with four equidistantly spaced-apart fingers 201, 202, 203, 204 extending outward from one elongate side edge and four equidistantly spaced-apart receptacles 205, 206, 207, 208 along the opposite elongate side edge. The four equidistantly spaced-apart receptacles 205, 206, 207, 208 are configured to demountably engage four equidistantly spaced-apart fingers 201, 202, 203, 204 of other similarly configured and sized three-layer interlockable composite bamboo industrial mats 200. Suitable dimensions for a three-layer interlockable composite bamboo industrial mat 200 are lengths from a range of about of about 2.5 m to about 5.0 m (about 8 ft to about 16.4 ft) and therebetween, widths from a range of about 1.0 m to about 2.0 m (about 3.25 ft to about 6.5 ft) and therebetween, and thicknesses from a range of about 37.5 mm to about 76 mm (about 1.5 in to about 3 in) and therebetween. A particularly suitable interlockable composite bamboo industrial mat may have dimensions of 3.9 m long, 2.2 m wide, and 60 mm thick (12.8 ft long, 7.2 ft wide, 2.5 in).

Interlockable composite bamboo industrial mat 200 comprises a top layer 210, an intermediate layer 230, and a bottom layer 220 (FIGS. 11, 12, 13.) that are secured together using a plurality of fasteners 140 in a repeating design. Also shown are lifting elements 102, which enable and facilitate the lifting, maneuvering, and moving about of the interlockable composite bamboo industrial mat 200 by equipment such as cranes, forklifts, excavators, backhoes and the like.

Each of the layers 210, 220, 230 comprises a plurality of elongate composite bamboo panels wherein the top layer 210 is provided with a pair of matching elongate composite bamboo panels 212a, 212b (FIGS. 11, 13). The bottom layer 220 is provided with three elongate composite bamboo panels 220a, 220b, 220c in parallel to the top panels 212a, 212b, wherein the center panel 220b is wider than the matching outer panels 220a, 220c (FIGS. 12, 13). The intermediate layer 230 is provided with a plurality of unmatched elongate composite bamboo panels 232a, 2132b, 232c, 232d wherein the elongate fractured and glued-together bamboo strips are perpendicular to the glued-together bamboo strips in the top panels 212a, 212b, and bottom panels 220a, 220b, 220c (FIG. 13).

The four equidistantly spaced-apart fingers 201, 202, 203, 204 extending outward from one elongate side edge of interlockable composite bamboo industrial mat 200 have been provided along the outward-facing side edge bottom of elongate composite bamboo panel 222c, and on the first ends of elongate composite bamboo panels 232a, 2132b, 232c, 232d of the intermediate industrial mat layer 230 (FIGS. 11, 13). The four equidistantly spaced-apart receptacles 205, 206, 207, 208 are provided along the outward-facing side edge bottom of elongate composite bamboo panel 222a and on the opposite ends of elongate composite bamboo panels 232a, 2132b, 232c, 232d of the intermediate industrial mat layer 230 (FIGS. 12, 13). When the interlockable composite bamboo industrial mat 200 is assembled by overlaying panels 222a, 222b, 222c of the bottom layer 220, with panels 232a, 2132b, 232c, 232d of the intermediate layer 230, and panels 212a, 212b of the top layer, and then securing the panels together with a plurality of fasteners 140, panel 212a provides a secure and solid top for receptacles 205, 206, 207, 208.

A temporary roadway for heavy rolling construction or industrial equipment may be quickly and easily installed over environmentally sensitive terrain or unstable terrain, by laying down multiple units of the interlockable composite bamboo industrial mat 200. A first interlockable composite bamboo industrial mat 200 may be positioned at a selected location by a suitable equipment such as an excavator or a backhoe or a heavy flatbed truck equipped with an onboard crane or a knuckle boom, whereby the equipment may demountably engage, manipulate, and maneuver the first interlockable composite bamboo industrial mat 200 by way of one or two lifting elements 102 provided therefor, into position. Then, the equipment may engage a second interlockable composite bamboo industrial mat 200 by one or more of its lifting elements 102, then lifted, manipulated, and maneuvered so that its four equidistantly spaced-apart receptacles 205, 206, 207, 208 are positioned over the four equidistantly spaced-apart fingers 201, 202, 203, 204 extending outward from the first interlockable composite bamboo industrial mat 200. The second interlockable composite bamboo industrial mat 200 may then be lowered or dropped into place such that its four equidistantly spaced-apart receptacles 205, 206, 207, 208 cover the four equidistantly spaced-apart fingers 201, 202, 203, 204 of the first interlockable composite bamboo industrial mat 200 such that the elongate sides of the first and second interlockable composite bamboo industrial mats 200 abut. Additional interlockable composite bamboo industrial mats 200 may be added as necessary to provide a temporary roadway having a desired sufficient length. If so desired, a second row (and additional rows) of interlockable composite bamboo industrial mats 200 may be laid down adjacent to the first row of interlockable composite bamboo industrial mats 200 to provide widened temporary roadways.

Figure 14:
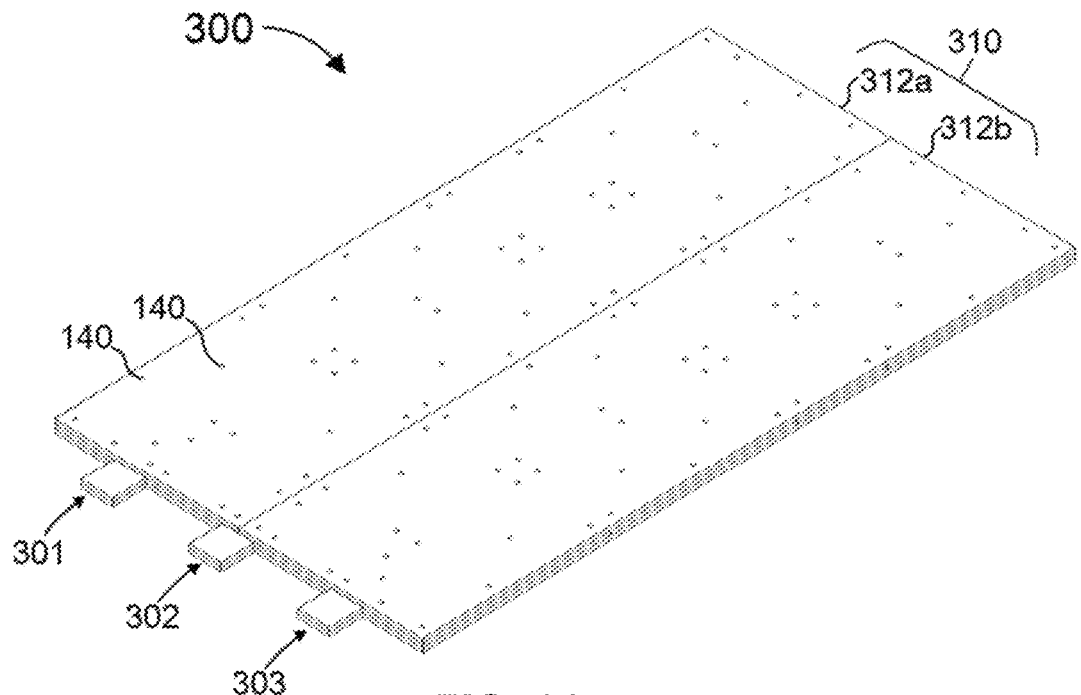
FIG. 14 is a top orthogonal view of a composite bamboo industrial mat according to another embodiment of the present disclosure.
Figure 15:
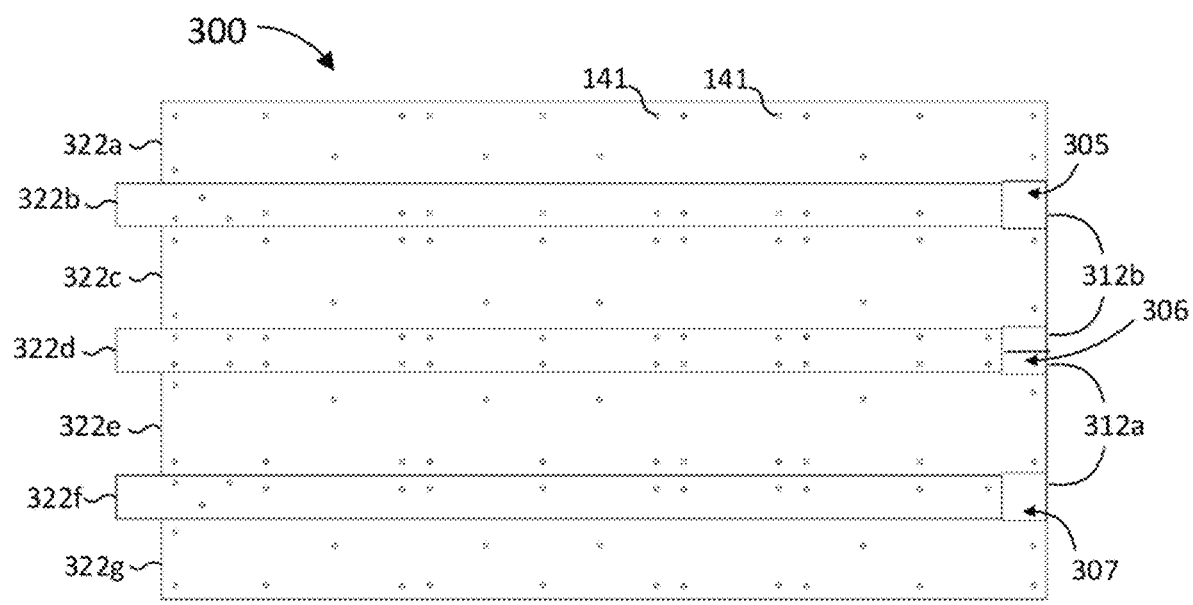
FIG. 15 is a bottom orthogonal view of the composite bamboo industrial mat shown in FIG. 14.
Figure 16:
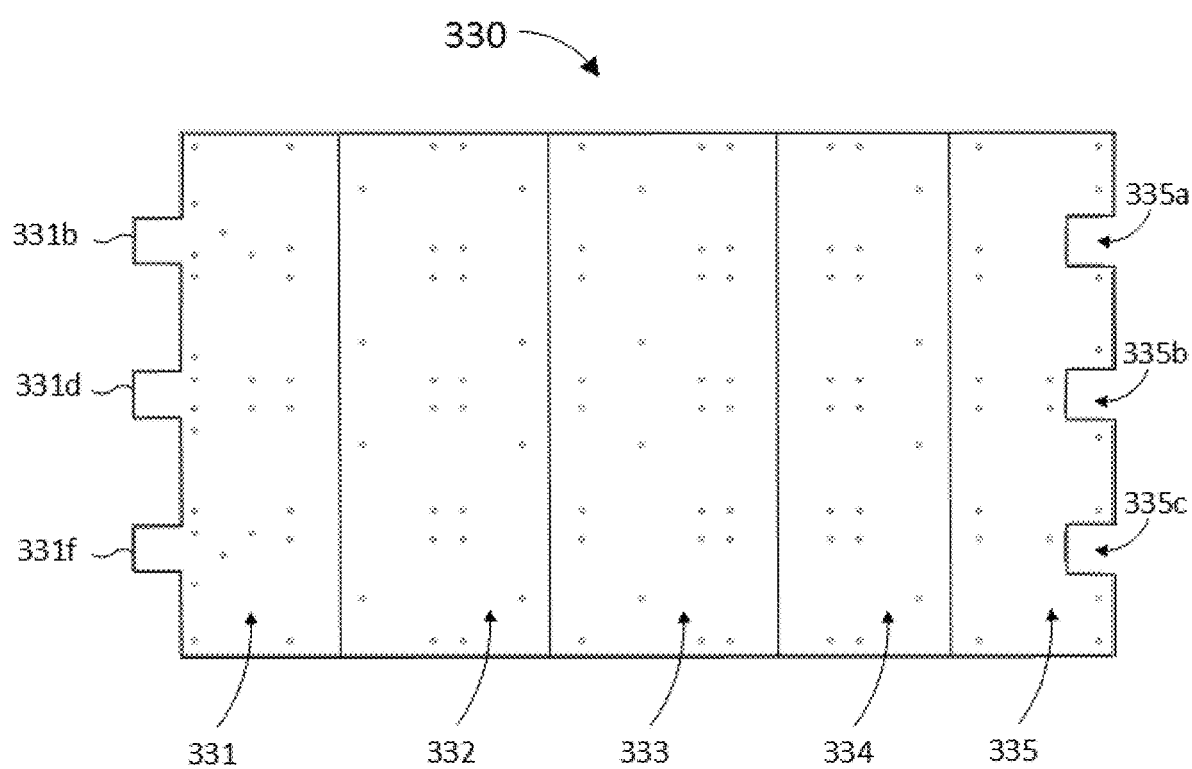
FIG. 16 is a bottom view of the intermediate layer of the composite bamboo industrial mat shown in FIG. 14.

Another embodiment of interlocking composite bamboo industrial mats according to this disclosure is illustrated in FIGS. 14 to 16. This interlocking composite bamboo industrial mat 300 comprises a top layer 310, a bottom layer 320, and an intermediate layer 330 that are secured together with a plurality of fasteners 140 in a repeating design. Interlocking composite bamboo industrial mat 300 has a plurality of fingers 301, 302, 303 extending from one end of the industrial mat 300 and a plurality of matching receptacles 305, 306, 307 at the other end of the industrial mat 300.

Each of the layers 310, 320, 330 comprises a plurality of elongate composite bamboo panels wherein the top layer 310 is provided with a pair of matching elongate composite bamboo panels 312a, 312b (FIG. 14). The bottom layer 320 comprises seven elongate composite bamboo subpanels 322a, 322b, 322c, 322d, 322e, 322f, 322g in parallel to the top panels 312a, 312b (FIG. 15). Wider elongate composite bamboo subpanels 322a, 322c, 322e, 322g are spaced apart by narrower elongate composite bamboo subpanels 322b, 322d, 322f. The narrower elongate composite bamboo subpanels 322b, 322d, 322f have the same widths and are positioned such that they each extend beyond the ends of the wider elongate composite bamboo subpanels 322a, 322c, 322e, 322g by a selected distance to thereby provide parts of fingers 301 (subpanel 322f), 302 (subpanel 322d), 303 (subpanel 322b). The resulting gaps at the other ends between wider elongate composite bamboo subpanels 322a, 322c, 322e, 322g provide portions of the receptacles 305 (subpanel 322b), 306 (subpanel 322d), 307 (subpanel 322f). Suitable distances for the narrower elongate composite bamboo subpanels 322b, 322d, 322f to extend beyond the ends of the wider elongate composite bamboo subpanels 322a, 322c, 322e, 322g are from a range of about 7.5 cm to about 30.5 cm (about 3 in to about 12 in) and therebetween. In the embodiment shown in FIG. 15, shows that the two inner wider elongate subpanels 322c 322e have the same widths (the inner wider elongate subpanels are a first pair of wider elongate subpanels) and are wider that the two outer wider elongate subpanels 322a, 322G (the outer wider elongate subpanels are a second pair of wider elongate subpanels). If so desired, it is within the scope of this disclosure to provide all of the first and second pairs of wider elongate subpanels with the same widths, or alternatively, to provide first pair of wider elongate subpanels with a first width and the second pair of wider elongate subpanels with a second width.

The intermediate layer 330 is provided with a plurality of unmatched elongate composite bamboo subpanels 331, 332, 333, 334, 335 wherein the elongate fractured and glued-together bamboo strips are perpendicular to the glued-together bamboo strips in the top layer 310 and bottom layer 320 (FIG. 16). Three fingers 331b, 331d, 331f extend from the outward-facing side elongate subpanel 331 and are configured to match the dimensions of the outward extending ends of elongate composite bamboo subpanels 322b, 322d, 322f of the bottom layer 320, to thereby form fingers 301, 302, 303 of industrial mat 300. The outward-facing side elongate subpanel 335 is provided with three notches 335a, 335b, 335c that are configured to match gaps between wider elongate composite bamboo subpanels 322a, 322c, 322e, 322g created by the narrower elongate composite bamboo subpanels 322b, 322d, 322f extending outward at their opposite ends to thereby form receptacles 305, 306, 307.

Suitable dimensions for a three-layer elongate interlocking composite bamboo industrial mat 300 are lengths from a range of about of about 2.5 m to about 5.0 m (about 8 ft to about 16.4 ft) and therebetween, widths from a range of about 1.0 m to about 2.0 m (about 3.25 ft to about 6.5 ft) and therebetween, and thicknesses from a range of about 37.5 mm to about 76 mm (about 1.5 in to about 3 in) and therebetween. A particularly suitable interlockable composite bamboo industrial mat may have dimensions of 3.9 m long, 2.2 m wide, and 60 mm thick (12.8 ft long, 7.2 ft wide, 2.5 in).

A temporary roadway for heavy rolling construction or industrial equipment may be quickly and easily installed over environmentally sensitive terrain or unstable terrain, by laying down multiple units of the interlockable composite bamboo industrial mat 300. A first interlockable composite bamboo industrial mat 300 may be positioned at a selected location by a suitable equipment such as an excavator or a backhoe or a heavy flatbed truck equipped with an onboard crane or a knuckle boom, whereby the equipment may demountable engage, manipulate, and maneuver the first interlockable composite bamboo industrial mat 300 into a selected position by gripping an elongate side or the receptacle end of the industrial mat 300. Then, the equipment may engage a second interlockable composite bamboo industrial mat 300, then lifting, manipulating, and maneuvering so that its three equidistantly spaced-apart receptacles 305, 306, 307 are positioned over the three equidistantly spaced-apart fingers 301, 302, 303 extending outward from the end of the first interlockable composite bamboo industrial mat 300. The second interlockable composite bamboo industrial mat 300 may then be lowered or dropped into place such that its four equidistantly spaced-apart receptacles 305, 306, 307 cover the four equidistantly spaced-apart fingers 301, 302, 303 of the first interlockable composite bamboo industrial mat 300 such that the elongate sides of the first and second interlockable composite bamboo industrial mats 300 abut. Additional interlockable composite bamboo industrial mats 300 may be added as necessary to provide a temporary roadway having a desired sufficient length. If so desired, a second row (and additional rows) of interlockable composite bamboo industrial mats 300 may be laid down adjacent to the first row of interlockable composite bamboo industrial mats 300 to provide widened temporary roadways. Because no glue was used between the top, intermediate, and bottom layers 310, 330, 320 of the interlockable composite bamboo industrial mat 300, these mats 300 are particularly suitable for use underneath very heavy rolling construction equipment and industrial equipment because they are designed to resiliently deform under heavy pressure without fracturing or breakage puncturing of the elongate composite bamboo panels and subpanels making up the top and bottom layers 310, 320 and the intermediate layer 330 laid down perpendicular to the top and bottom layers 310, 320 diffuses the weight of the heavy equipment across the width of the interlockable hybrid composite bamboo industrial mats 300 and are able to individually deform flex as the heavy equipment rolls across the mats 300, and then to return to their resting and unstressed flat condition.

An example embodiment of interlocking hybrid composite bamboo industrial mats according to this disclosure is illustrated in FIGS. 17 to 20. This interlocking hybrid composite bamboo industrial mat 400 comprises a top layer 410 of elongate composite bamboo panels, a bottom layer 420 of elongate composite bamboo panels, and an intermediate section 430 that comprises a plurality of stacked layers of hardwood or softwood boards. The top layer 410, bottom layer 420, and intermediate section 430 are secured together with a plurality of fasteners 140 in a repeating design. Interlocking hybrid composite bamboo industrial mat 300 has a plurality of fingers 401, 402, 403 extending from one end of the industrial mat 400 and a plurality of matching receptacles 405, 406,407 at the other end of the hybrid industrial mat 400.

Figure 17:
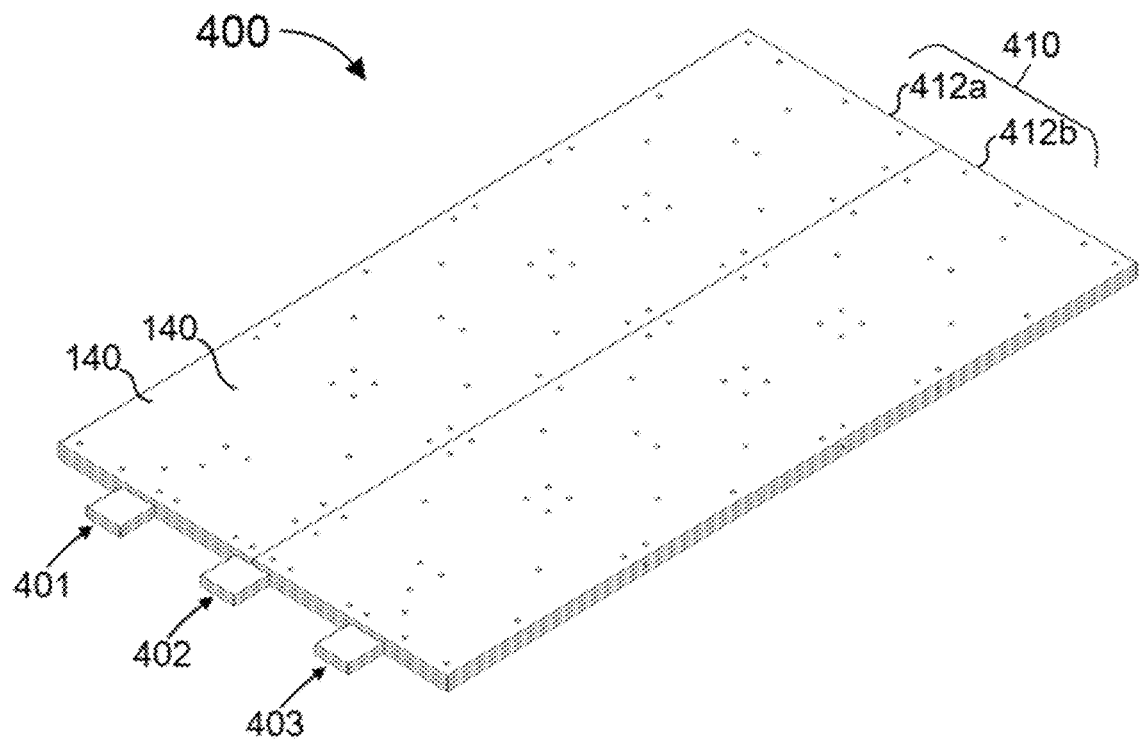
FIG. 17 is a top orthogonal view of an interlockable elongate industrial mat according to another embodiment of the present disclosure, wherein the top and bottom layers comprise elongate composite bamboo panels and the intermediate layer comprises multiple layers of wood boards perpendicular to the top and bottom layers.
Figure 18:
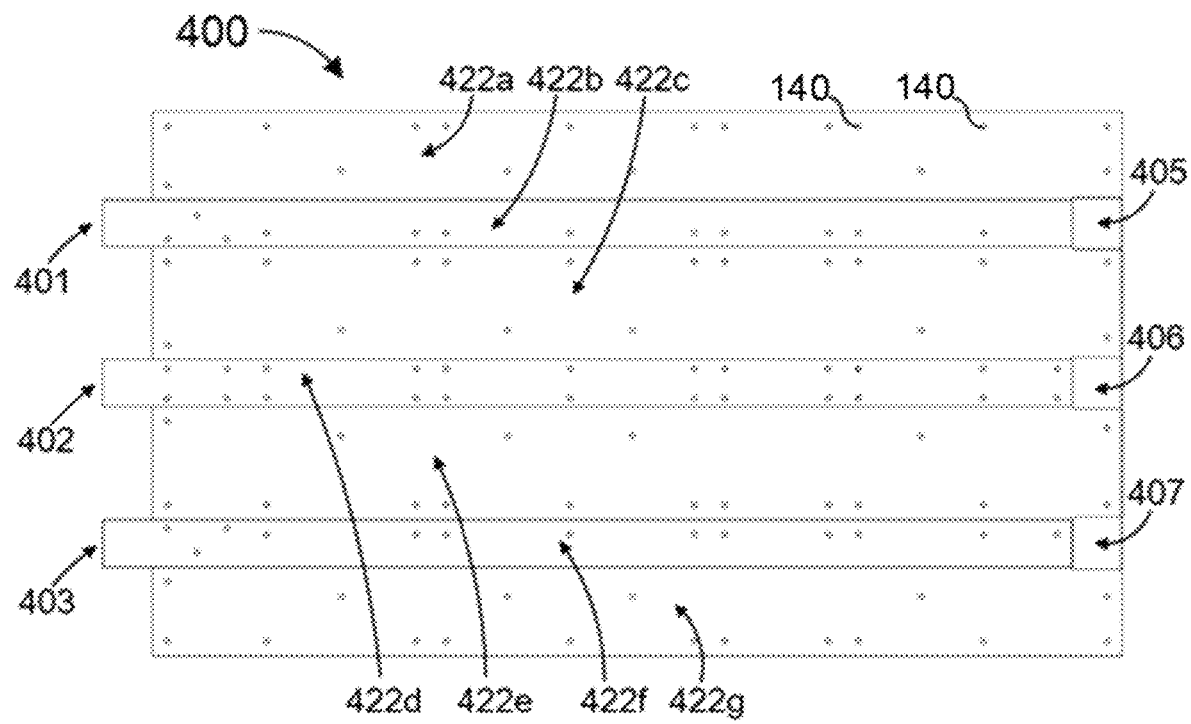
FIG. 18 is a bottom view of the composite bamboo industrial mat shown in FIG. 17.

The top layer 410 and bottom layer 420 comprise a plurality of elongate composite bamboo panels wherein the top layer 410 is provided with a pair of matching elongate composite bamboo panels 412a, 412b (FIG. 17). The bottom layer 420 comprises seven elongate composite bamboo subpanels 422a, 422b, 422c, 422d, 422e, 422f, 422g in parallel to the top panels 412a, 412b (FIG. 18). Wider elongate composite bamboo subpanels 422a, 422c, 422e, 422g are spaced apart by narrower elongate composite bamboo subpanels 422b, 422d, 422f. The narrower elongate composite bamboo subpanels 422b, 422d, 422f have the same widths and are positioned such that they each extend beyond the ends of the wider elongate composite bamboo subpanels 422a, 422c, 422e, 422g by a selected distance to thereby provide parts of fingers 401 (subpanel 422f), 402 (subpanel 422d), 403 (subpanel 422b). The resulting gaps at the other ends between wider elongate composite bamboo subpanels 422a, 422c, 422e, 422g provide portions of the receptacles 405 (subpanel 422b), 406 (subpanel 422d), 407 (subpanel 422f). Suitable distances for the narrower elongate composite bamboo subpanels 422b, 422d, 422f to extend beyond the ends of the wider elongate composite bamboo subpanels 422a, 422c, 422e, 422g are from a range of about 7.5 cm to about 30.5 cm (about 3 in to about 12 in) and therebetween. In the embodiment shown in FIG. 18, it can be seen that the two inner wider elongate subpanels 422c 422e have the same widths (the inner wider elongate subpanels are a first pair of wider elongate subpanels) and are wider that the two outer wider elongate subpanels 422a, 422G (the outer wider elongate subpanels are a second pair of wider elongate subpanels). If so desired, it is within the scope of this disclosure to provide all of the first and second pairs of wider elongate subpanels with the same widths, or alternatively, to provide first pair of wider elongate subpanels with a first width and the second pair of wider elongate subpanels with a second width.

Figure 19:
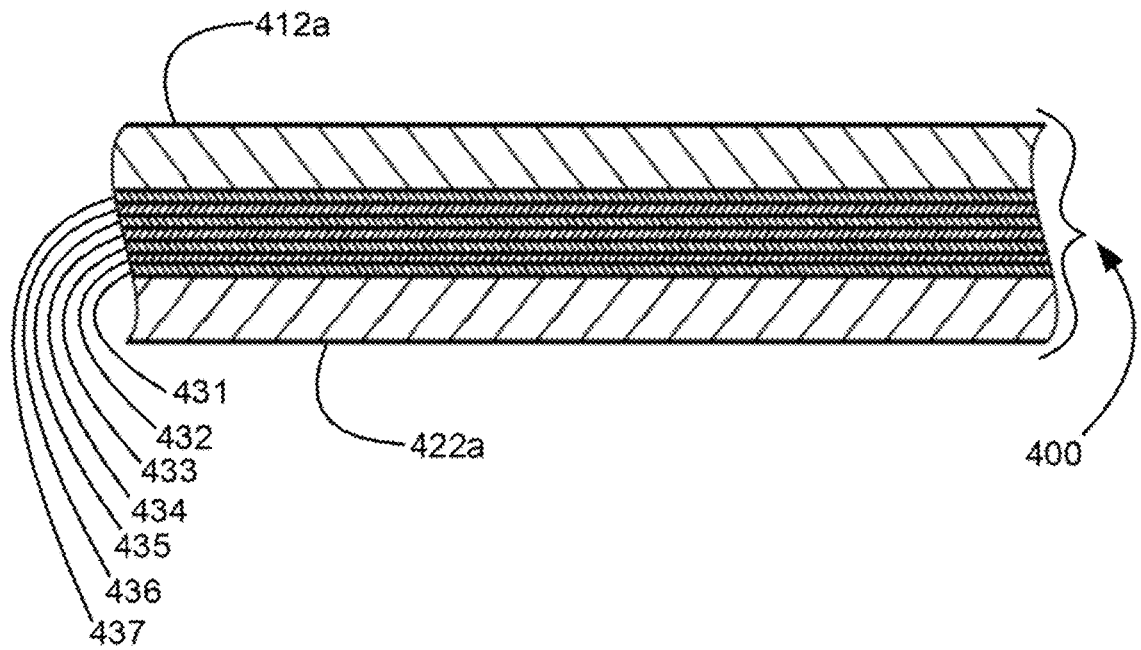
FIG. 19 is a partial side view of the industrial mat shown in FIG. 17.
Figure 20:
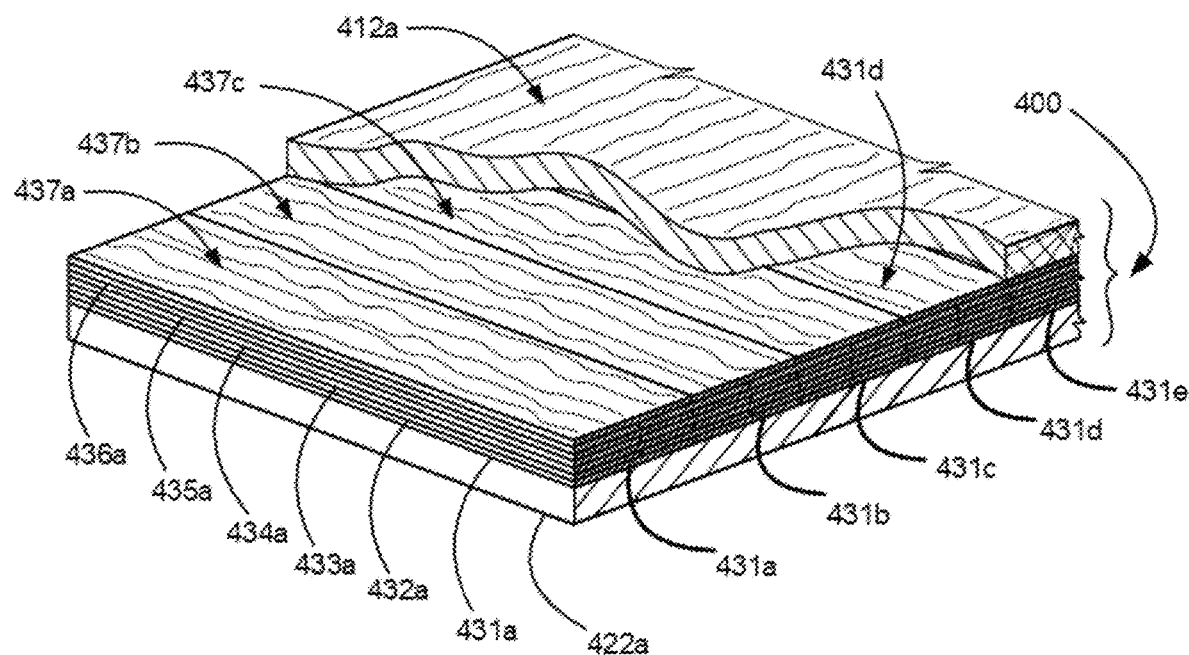
FIG. 20 is a partial orthogonal view from the top of the industrial mat shown in FIG. 17.

The intermediate section 430 is provided with a plurality of stacked layers 431, 432, 433, 434, 435, 436, 437 of hardwood or softwood boards laid down perpendicular to the elongate composite bamboo panels comprising the top and bottom layers 410, 420 of hybrid industrial mat 400 (FIGS. 19, 20). Each layer 431, 432, 433, 434, 435, 436, 437 comprises a plurality of boards laid side-by-side as illustrated in FIG. 20 where can be seen boards 431a, 431b, 431c, 431d of the first layer 431 that overlap boards 432a, 432b, 432c, 432d, 432e of the second layer 432. The bottom layer 431 (FIG. 19) of the boards are laid down on the bed of a press and their elongate side edges are glued together as exemplified by boards 431a, 431b, 431c, 431d, 431e in FIG. 20 with as many boards 431 laid down until a desired length for the intermediate section 430 is reached. Then the bottoms of the second layer of boards 432 are glued to the tops of boards 431 with the elongate side edges of the second layer of boards 432 also glued together whereby the side edges of the boards 432 positioned over top of the midsections of the first layer of bards 431 (FIG. 20). This process is repeated for the third, fourth, fifth, sixth, and seventh layers of boards 433. 434. 435, 436, 437 (FIGS. 19, 20).

Suitable dimensions for the hardwood or softwood boards for use in the intermediate section 430 have thicknesses from a range of about 6.35 mm to about 19.00 mm (about ¼ in to about ¾ in) and therebetween, and widths from a range of about 10.15 cm to about 20.30 cm (about 4 in to about 8 in) and therebetween. The length of the boards are selected to match the width of hybrid industrial mat 400. It is suitable, if thicker boards are used, to provide fewer layers for the intermediate section 430 of hybrid industrial mat 400. For example, if the thickness of boards selected is about 6.35 mm, then seven layers of boards may be provided for the intermediate section 430 as illustrated in FIGS. 19, 20. For example, if the thickness of boards selected is about 19.0 mm, then three layers of boards may be provided for the intermediate section 430 (not illustrated). Accordingly, the intermediate section of interlocking hybrid composite bamboo industrial mat may comprise any of three, four, five, six, seven layers of hardwood or softwood boards. It is to be noted that the boards comprising a layer of hardwood or softwood boards are not glued together, and neither are the pluralities of overlapping layers of hardwood or softwood boards glued together. Instead, the boards comprising the bottom layer of hardwood or softwood boards are laid side-by-side on the elongate composite bamboo bottom layer 430, after which, a second layer of hardwood or softwood boards is laid down on the bottom layer of hardwood or softwood boards such that each board of the second layer overlaps two underlying hardwood or softwood boards as illustrated in FIG. 19. After the final layer of hardwood or softwood boards is laid down, the elongate composite bamboo panels comprising the top layer 410 is laid down. Examples of suitable hardwoods for providing boards for the intermediate layers include poplar, aspen, birches, maples, oaks and the like. Examples of suitable softwoods for providing boards for the intermediate layers include pines, firs, hemlocks, cedars, and the like.

Then, holes are drilled through the top layer of elongate composite bamboo panes 410, plurality of layers of hardwood or softwood boards comprising the intermediate layer 430, and the elongate composite bamboo subpanels comprising the bottom layer 420 in a repeating as illustrated in FIGS. 17, 18. According to one aspect, the bolt components of fasteners 140 may be inserted upward through the drilled holes in the bottom layer 420, the intermediate layer 430 of multiple layers of hardwood or softwood boards, and the top layer 410, after which, an outward-facing concave washer is slipped over the threaded end of each bolt, and a sleeve anchor nut is threadably engaged with each bolt to thereby tightly secure together the top layer 410, the intermediate layer 430, and the bottom layer 420, thereby forming an embodiment of an interlocking hybrid composite bamboo industrial mat shown in FIGS. 17 to 20. According to another aspect, the bolt components of fasteners 140 may be inserted downward into the drilled holes through the top layer 410, the intermediate layer 430 of multiple layers of hardwood or softwood boards, and the bottom layer 430, after which, an outward-facing concave washer is slipped over the threaded end of each bolt, and a sleeve nut is threadably engaged with each bolt to thereby tightly secure together the top layer 410, the intermediate layer 430, and the bottom layer 420, thereby forming another embodiment of an interlocking hybrid composite bamboo industrial mat as shown in FIGS. 17 to 20.

Suitable dimensions for a three-layer elongate interlocking hybrid composite bamboo industrial mat 400 are lengths from a range of about of about 2.5 m to about 5.0 m (about 8 ft to about 16.4 ft) and therebetween, widths from a range of about 1.0 m to about 2.0 m (about 3.25 ft to about 6.5 ft) and therebetween, and thicknesses from a range of about 37.5 mm to about 76 mm (about 1.5 in to about 3 in) and therebetween. A particularly suitable interlockable composite bamboo industrial mat may have dimensions of 3.9 m long, 2.2 m wide, and 60 mm thick (12.8 ft long, 7.2 ft wide, 2.5 in).

A temporary roadway for heavy rolling construction or industrial equipment may be quickly and easily installed over environmentally sensitive terrain or unstable terrain, by laying down multiple units of the interlockable hybrid composite bamboo industrial mat 400. A first interlockable hybrid composite bamboo industrial mat 400 may be positioned at a selected location by a suitable equipment such as an excavator or a backhoe or a heavy flatbed truck equipped with an onboard crane or a knuckle boom, whereby the equipment may demountable engage, manipulate, and maneuver the first interlockable hybrid composite bamboo industrial mat 400 into a selected position by gripping an elongate side or the receptacle end of the industrial mat 400. Then, the equipment may engage a second interlockable hybrid composite bamboo industrial mat 400, then lifting, manipulating, and maneuvering it so that its three equidistantly spaced-apart receptacles 405, 406, 407 are positioned over the three equidistantly spaced-apart fingers 401, 402, 403 extending outward from the end of the first interlockable hybrid composite bamboo industrial mat 400. The second interlockable hybrid composite bamboo industrial mat 400 may then be lowered or dropped into place such that its three equidistantly spaced-apart receptacles 405, 406, 407 cover the three equidistantly spaced-apart fingers 401, 402, 403 of the first interlockable hybrid composite bamboo industrial mat 400 such that the ends of the first and second interlockable hybrid composite bamboo industrial mats 400 abut. Additional interlockable hybrid composite bamboo industrial mats 400 may be added as necessary to provide a temporary roadway having a desired sufficient length. If so desired, a second row (and additional rows) of interlockable hybrid composite bamboo industrial mats 400 may be laid down adjacent to the first row of interlockable hybrid composite bamboo industrial mats 400 to provide widened temporary roadways. Because no glue was used between: (i) the plurality of layers of hardwood or softwood boards or between adjacent boards comprising the intermediate layer 430, (ii) the top layer 410 and intermediate layer 430, and (iii) the intermediate layer 430 and bottom layer 420 of the interlockable hybrid composite bamboo industrial mats 400, these mats 400 are particularly suitable for use underneath very heavy rolling construction equipment and industrial equipment because they are designed to resiliently deform under heavy pressure without fracturing or breakage or puncturing of the elongate composite bamboo panels and subpanels making up the top and bottom layers 410, 420 while the intermediate layer 430 comprising pluralities of hardwood or softwood boards laid down perpendicular to the top and bottom layers 410, 420 diffuse the weight of the heavy equipment across the width of the interlockable hybrid composite bamboo industrial mats 400 and are able to individually deform and flex as the heavy equipment rolls across the mats 400, and then to return to their resting and unstressed flat condition.

Figure 21:
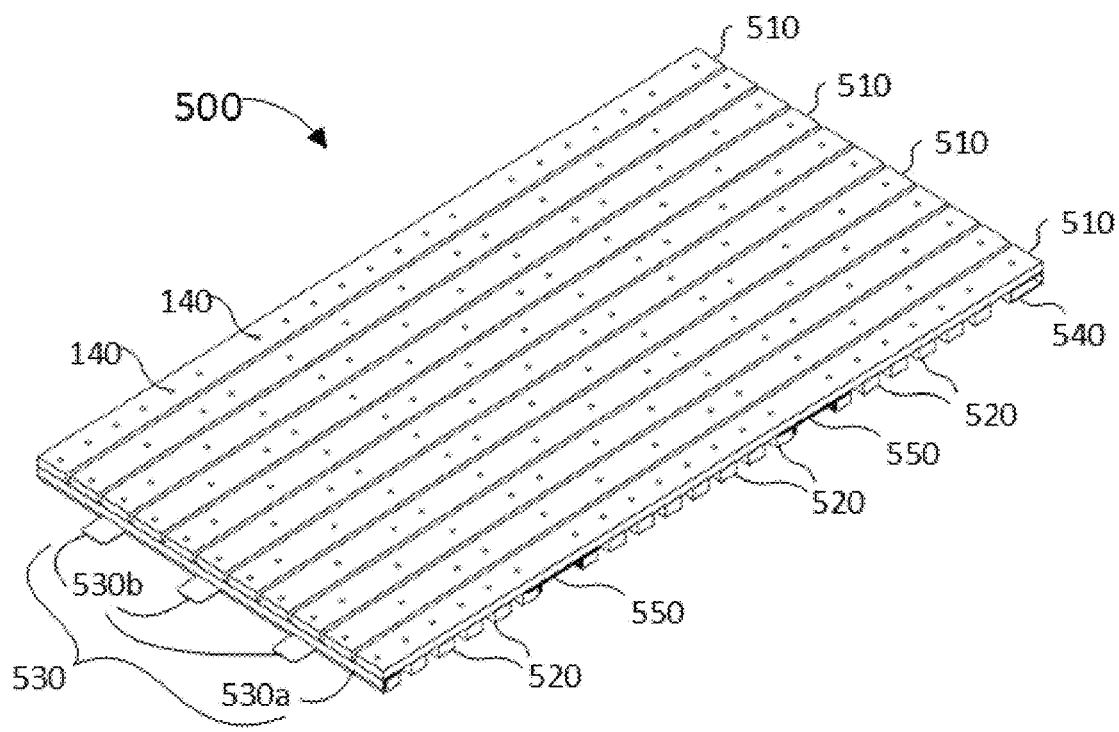
FIG. 21 is a top orthogonal view of a two-layer composite bamboo industrial mat according to another embodiment of the present disclosure.
Figure 22:
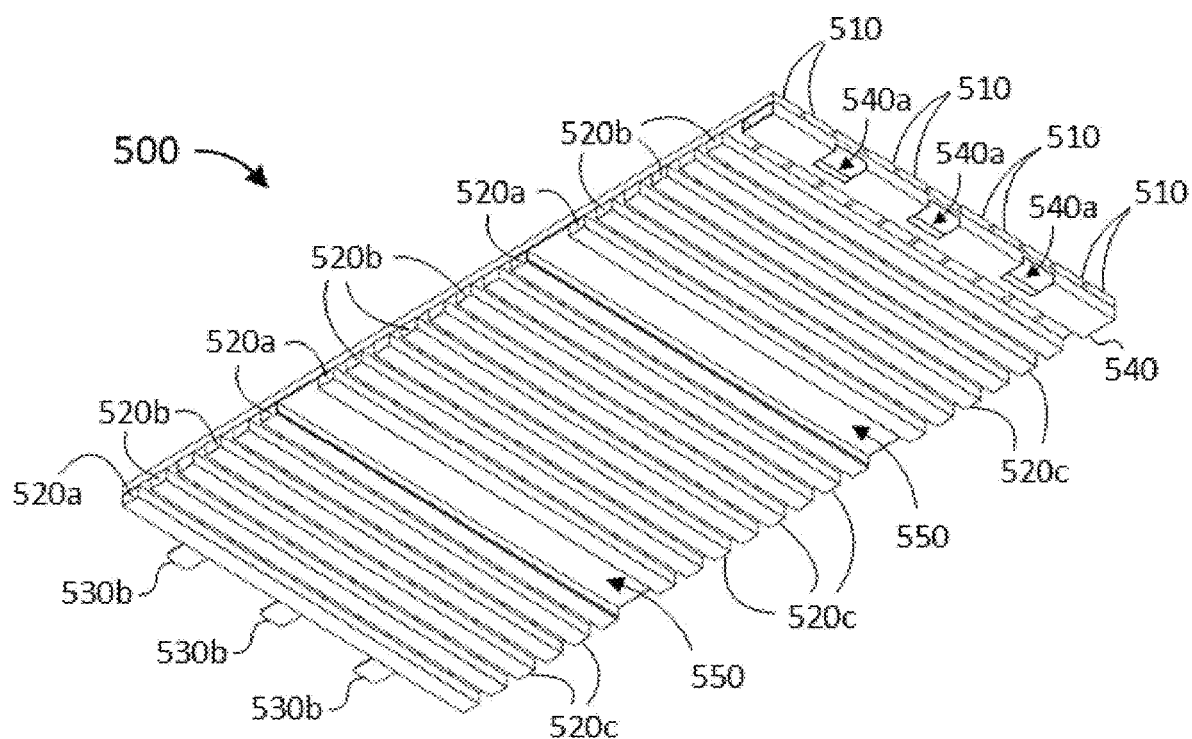
FIG. 22 is a bottom orthogonal view of the two-layer composite bamboo industrial mat shown in FIG. 21.

An example embodiment of interlocking two-layer composite bamboo industrial mats according to this disclosure is illustrated in FIGS. 21 to 26B. This interlocking two-layer composite bamboo industrial mat 500 comprises: (i) a top layer of compressed elongate composite bamboo boards 510 sawn from compressed elongate composite bamboo panels comprising adhesive-coated elongate fractured bamboo strips produced as described earlier herein, (ii) a bottom layer of compressed elongate composite bamboo boards 520 perpendicular to the top layer of compressed elongate composite bamboo boards 510, (iii) a male metal Z-bend end bracket 530 at one end of the top layer of elongate composite bamboo boards 510, (iv) a female hollow metal rectangular tube 540 at the opposite end of the top layer of elongate composite bamboo boards 510, and (v) a pair of spaced-apart metal U-channels 550 equidistantly spaced from the opposite ends of the top layer of elongate composite bamboo boards 510. The male metal Z-bend end bracket 530 comprises a bottom plate in the form of three outward-projecting equally distanced spaced-apart fingers 530b, a vertical side plate 530a and an upper plate provided with a plurality of equidistantly spaced-apart bores 530c provided therethrough (FIGS. 21, 22, 23, 24). Three equally spaced-apart receptacles 540a are provided in one side wall and the bottom surface of the female hollow metal rectangular tube 540 and are configured to slidingly receive therein the three outward-projecting equally spaced-apart fingers 530b of the male metal Z-bend end bracket 530 (FIGS. 22, 25A, 25B). A plurality of equidistantly spaced-apart bores 540b are provided therethrough the female hollow metal rectangular tube 540 and match the spacing of plurality of bores 530c provided therethrough the male metal Z-bend end bracket 530. Each of the U-channels 550 is provided with opposing flanges extending outward along the length of the channel 550 thereby providing a top surface 550a and two downward extending legs 550b spaced inboard from the outer elongate edges of the top surface 550a (FIGS. 26A, 206B). A pair of plurality of equidistantly spaced-apart bores 550c are provided along the length of each U-channel 550 outboard from the two downward-extending legs 550b. The spacing of each pair of the plurality of bores 550c matches the spacing of the plurality of bores 530c provided in the male metal Z-bend end bracket 530 and the spacing of the plurality of bores 540b provided in the female hollow metal rectangular tube 540. The two downward-extending legs 550b of the U-channels 550 may be spaced apart by about 10.2 cm, 12.7 cm, 15.2 cm, 17.8 cm, and therebetween (about 4 in, 5 in, 6 in, 7 in) to enable sliding engagement and disengagement with the forks of a forklift.

Figure 23:
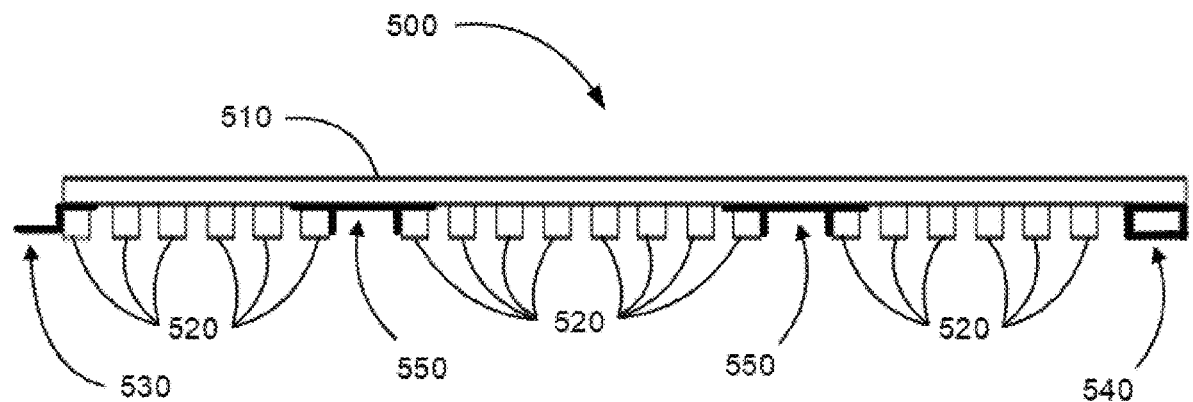
FIG. 23 is a side view of the two-layer composite bamboo industrial mat shown in FIGS. 21 and 22.

The interlocking two-layer composite bamboo industrial mat 500 illustrated in FIGS. 21, 22, 23 is provided with eleven spaced-apart compressed elongate composite bamboo boards 510 for the top layer of the industrial mat 500, and twenty spaced-apart compressed elongate composite bamboo boards 520 for the bottom layer, positioned perpendicular to the top layer.

Figure 24:
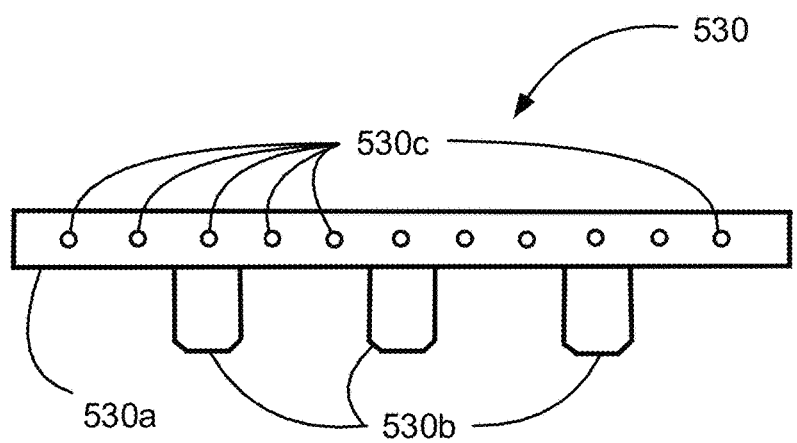
FIG. 24 is a top view of the male metal end plate component of the industrial mat shown in FIGS. 21 and 22.
Figure 25A:
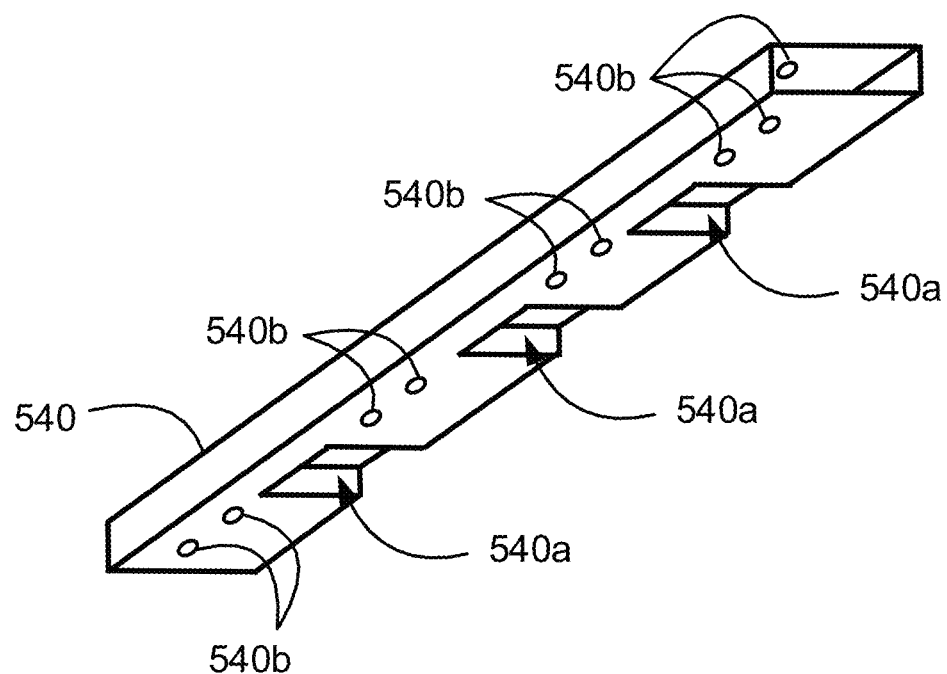
FIG. 25A is an orthogonal bottom view of the female end component of the industrial mat shown in FIGS. 21 and 22.
Figure 25B:
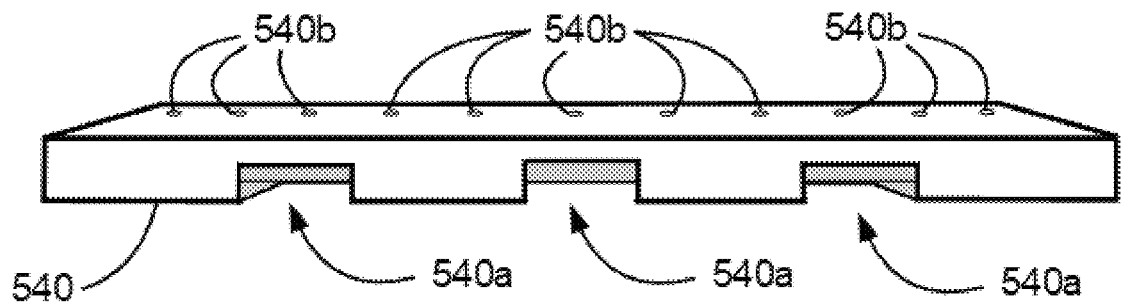
FIG. 25B is a perspective end view of the female end component shown in FIG. 25A.
Figure 26A:
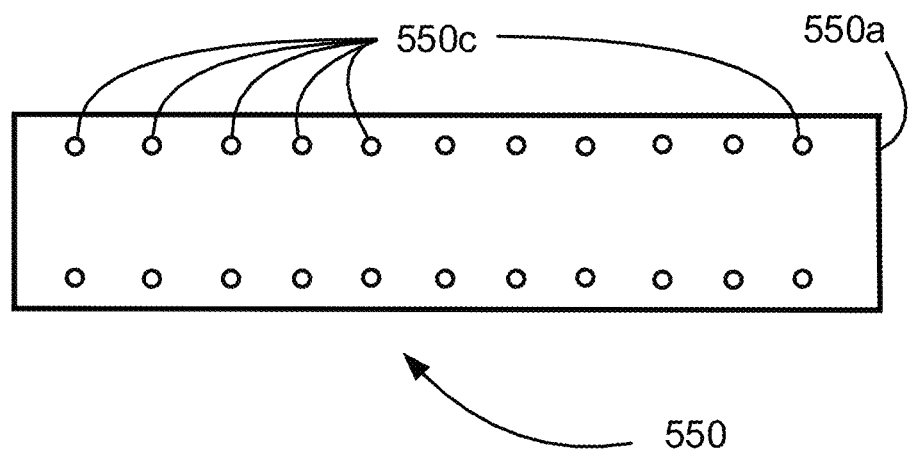
FIG. 26A is a top view of a metal skid plate component of the industrial mat shown in FIGS. 21 and 22.
Figure 26B:
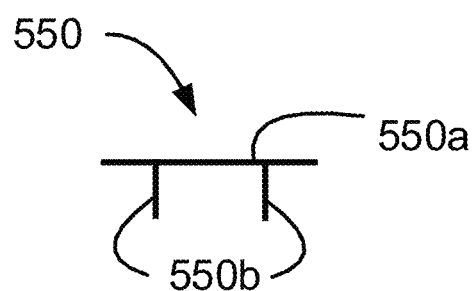
FIG. 26B is an end view of the metal skid plate component shown in FIG. 26A.

The two outer elongate composite bamboo boards 510 (shown as boards 510a in FIG. 21) for the top layer are provided with bores therethrough to align with the two outer bores 530c in the male metal Z-bend end bracket 530, the two outer bores 540b the female hollow metal rectangular tube 540, and a pair of opposing bores 550c provided in each of the two spaced-apart metal U-channels 550 (FIGS. 21, 24, 25B, 26A). Five of the nine remaining elongate composite bamboo boards 510 (shown as boards 510b in FIG. 21) are provided with bores that are aligned with bores 530c in the male metal Z-bend end bracket 530, bores 550c in the pair of spaced-apart metal U-channels 550, and bores 540b in the female hollow metal rectangular tube 540 (FIGS. 23, 24, 25).

The first perpendicular elongate composite bamboo board 520 (shown as board 520a in FIG. 22) at the male metal Z-bend end bracket 530, is provided with eleven bores spaced-apart to match the spacing of bores 530c in the male metal Z-bend end bracket 530. Two pairs of perpendicular elongate composite bamboo boards 520 (shown as boards 520a in FIG. 22) are provided with eleven bores spaced-apart to match the spacing of bores 550c in the metal U-channels 550. Eight of the remaining fifteen perpendicular elongate composite bamboo boards 520 (shown as boards 520b in FIG. 22) are provided with bores to align with the first, third, fifth, seventh, ninth, and eleventh bores 530c in the male metal Z-bend end bracket 530. The remaining seven perpendicular elongate composite bamboo boards 520 (shown as boards 520c in FIG. 22) are provided with bores to align with the first, second, fourth, sixth, eighth, tenth, and eleventh bores 530c in the male metal Z-bend end bracket 530.

The interlocking two-layer composite bamboo industrial mat 500 illustrated in FIGS. 21, 22, 23 may be assembled by placing the first perpendicular elongate composite bamboo board 520a underneath the upper plate of male metal Z-bend end bracket 530 so that the bores in the board 520a, 520b are aligned with bores 530c in the male metal Z-bend end bracket 530. The bolt components of fasteners 140 may have downward-facing concave washers inserted and then may be inserted upward through the drilled holes in the perpendicular elongate composite bamboo boards 520a, 520b, the male metal Z-bend end bracket 530, the metal U-channels 550m and the female hollow metal rectangular tube 540, after which, an outward-facing concave washer is slipped over the threaded end of each bolt, and a sleeve nut is threadably engaged with each bolt to thereby tightly secure together the upper elongate composite bamboo boards 510

Suitable dimensions for a two-layer elongate interlocking hybrid composite bamboo industrial mat 500 are lengths from a range of about of about 2.5 m to about 5.0 m (about 8 ft to about 16.4 ft) and therebetween, widths from a range of about 1.0 m to about 2.0 m (about 3.25 ft to about 6.5 ft) and therebetween, and thicknesses from a range of about 37.5 mm to about 76 mm (about 1.5 in to about 3 in) and therebetween. A particularly suitable interlockable composite bamboo industrial mat may have dimensions of 3.9 m long, 2.2 m wide, and 60 mm thick (12.8 ft long, 7.2 ft wide, 2.5 in).

It is to be noted that the two metal U-channels 550 of the interlocking two-layer composite bamboo industrial mat 500, are spaced apart by eight perpendicular elongate composite bamboo boards 520 that are securely engaged to the upper elongate composite bamboo boards 510 by fasteners 140 to thereby provide a pair of channels that can slidably receive and engage a pair of forks of a forklift. The forklift may then lift and place the interlocking composite bamboo industrial mat 500 onto a flatbed of a truck or onto a flat-bed trailer. A plurality of interlocking two-layer composite bamboo industrial mat 500 may then be stacked on top of the first interlocking composite bamboo industrial mat 500, then tied down with suitable strapping devices, and conveyed to a job site where they may be unstrapped and removed from the flat bed by another forklift.

A temporary roadway for heavy rolling construction or industrial equipment may be quickly and easily installed over environmentally sensitive terrain or unstable terrain, by laying down multiple units of the interlocking two-layer composite bamboo industrial mat 500. A first interlocking composite bamboo industrial mat 500 may be positioned at a selected location by a suitable equipment such as an excavator or a backhoe or a heavy flatbed truck equipped with an onboard crane or a knuckle boom, whereby the equipment may demountable engage, manipulate, and maneuver the first interlocking hybrid composite bamboo industrial mat 500 into a selected position by sliding engagement with 4 chains and hooks attached to the equipment's hoisting components (for example, a boom, hoist and hook). Then, the equipment may engage a second interlocking composite bamboo industrial mat 500, then lifting, manipulating, and maneuvering so that its three equidistantly spaced-apart receptacles 540a are positioned over the three equidistantly spaced-apart fingers 530b extending outward from the end of the first interlocking composite bamboo industrial mat 500. The second interlocking composite bamboo industrial mat 500 may then be lowered or dropped into place such that its three equidistantly spaced-apart receptacles 540a cover the three equidistantly spaced-apart fingers 530b of the first interlocking composite bamboo industrial mat 500 such that the ends of the first and second interlocking composite bamboo industrial mat 500 abut. Additional interlocking composite bamboo industrial mat 500 may be added as necessary to provide a temporary roadway having a desired sufficient length. If so desired, a second row (and additional rows) of interlocking composite bamboo industrial mat 500 may be laid down adjacent to the first row of interlocking composite bamboo industrial mat 500 to provide widened temporary roadways. Because no glue was used between the spaced-apart compressed elongate composite bamboo boards 510 of the top layer of the industrial mat 500, and bottom perpendicular spaced-apart compressed elongate composite bamboo boards 520 of the bottom layer, these mats 500 are also particularly suitable for use underneath very heavy rolling construction equipment and industrial equipment because they are designed to resiliently deform under heavy pressure without fracturing or breakage or puncturing of the upper compressed elongate composite bamboo boards 510 or the bottom perpendicular spaced-apart compressed elongate composite bamboo boards 520, while diffusing the weight of the heavy equipment across the width of the interlocking composite bamboo industrial mat 500 and are able to individually deform and flex as the heavy equipment rolls across the mats 500, and then to return to their resting and unstressed flat condition.

The invention claimed is:

1. An interlocking elongate composite bamboo industrial mat, comprising:
   an upper layer having two or more elongate laminated composite bamboo panels arranged in parallel, in contact, thereby forming one or more upper side joints;
   an intermediate layer having a plurality of elongate laminated composite bamboo panels arranged in parallel, in contact, and perpendicular to the laminated composite bamboo panels in the upper layer, thereby forming a plurality of intermediate side joints;
   a bottom layer having a plurality of elongate laminated composite bamboo panels arranged in parallel to the upper layer, in contact, thereby forming two or more bottom side joints wherein the two or more bottom side joints overlap the one or more upper side joints; and
   a plurality of fasteners securing together the upper layer of elongate laminated composite bamboo panels, the intermediate layer of elongate laminated composite bamboo panels, and the bottom layer of elongate laminated composite bamboo panels through bores provided therefor, wherein each of the plurality of fasteners consists of a bolt, an outward-facing concave washer engaged with a head of the bolt, and one of a sleeve nut having an outward-facing washer engaged with a head of the sleeve nut or a sleeved anchor nut having an outward-facing concave washer engaged with a head of the sleeve anchor nut;
   wherein each of the elongate laminated composite bamboo panels comprises a plurality of kiln-dried glue-dipped elongate asymmetrically fractured bamboo strips compressed into a solid panel devoid of air spaces; and
   wherein the interlocking elongate composite bamboo industrial mat is configured to interlock end-to-end with another matching interlocking elongate composite bamboo industrial mat, or alternatively, is configured to interlock side-to-side with another matching interlocking elongate composite bamboo industrial mat.

2. The elongate interlocking composite bamboo industrial mat of claim 1, wherein one end of the elongate interlocking composite bamboo industrial mat is provided with two or more equidistantly spaced-apart fingers extending outward therefrom, said fingers formed from the bottom layer and intermediate layer of the elongate laminated composite bamboo panels, said one end being a finger end, and
   wherein the opposite end of the elongate interlocking composite bamboo industrial mat is provided with two or more equidistantly spaced-apart receptacles extending thereinto, said receptacles formed into the bottom layer and intermediate layer of the elongate laminated composite bamboo panels, said receptacles matching said fingers, said opposite end being a receptacle end.

3. The elongate interlocking composite bamboo industrial mat of claim 2, wherein the two or more equidistantly spaced-apart fingers extending outward therefrom, and the two or more equidistantly spaced-apart receptacles extending thereinto, are formed by (i) extending outward two of the plurality of elongate laminated composite bamboo panels of the bottom layer relative to the remaining plurality of elongate laminated composite bamboo panels of the bottom layer, (ii) providing a matching set of fingers extending outward from an elongate laminated composite bamboo panel of the intermediate layer at the finger end, and (iii) providing a matching set of receptacles extending into an elongate laminated composite bamboo panel of the intermediate layer at the receptacle end.

4. The elongate interlocking composite bamboo industrial mat of claim 1, wherein one side of the elongate interlocking composite bamboo industrial mat is provided with two or more equidistantly spaced-apart fingers extending outward therefrom, said fingers formed from the bottom layer and intermediate layer of the elongate laminated composite bamboo panels, said one side being a finger side, and
   wherein the opposite side of the elongate interlocking composite bamboo industrial mat is provided with two or more equidistantly spaced-apart receptacles extending thereinto, said receptacles formed into the bottom layer and intermediate layer of the elongate laminated composite bamboo panels, said receptacles matching said fingers, said opposite side being a receptacle side.

5. The elongate interlocking composite bamboo industrial mat of claim 4, wherein (i) an outside panel of the plurality of elongate laminated composite bamboo panels forming the bottom layer is provided with the two or more equidistantly spaced-apart fingers, (ii) two panels of the plurality of elongate laminated composite bamboo panels forming the intermediate layer are provided with matching two or more equidistantly spaced-apart fingers on their finger sides, (iii) an opposite outside panel of the plurality of elongate laminated composite bamboo panels forming the bottom layer is provided with the two or more equidistantly spaced-apart receptacles, and (iv) the two panels of the plurality of elongate laminated composite bamboo panels forming the intermediate layer are provided with matching two or more equidistantly spaced-apart receptacles on their receptacle sides.

6. The elongate interlocking composite bamboo industrial mat of claim 1, wherein the elongate linear asymmetrically fractured bamboo strips in each of the elongate laminated composite bamboo panels extend from one end to the other end of the panel.

7. The elongate interlocking composite bamboo industrial mat of claim 1, additionally having matching pairs of U-shaped lifting elements along opposite elongate sides of the mat, said matching pairs of U-shaped lifting elements equidistantly spaced from the ends of the mat, wherein each of the matching pairs of U-shaped lifting elements is provided with a metal framework defining the U-shape provided, and a hookable member extending thereacross.

8. The elongate interlocking composite bamboo industrial mat of claim 7, wherein the hookable member is one of a strap or a metal bar.

9. The elongate interlocking composite bamboo industrial mat of claim 1, wherein the intermediate layer has between three stacked rows to seven stacked rows of pluralities of thinly sawn boards arranged in parallel, in contact, and perpendicular to the laminated composite bamboo panels in the upper layer, wherein a first plurality of intermediate side joints in a first stacked layer overlaps a second plurality of intermediate side joints in a stacked layer.

10. The elongate interlocking composite bamboo industrial mat of claim 9, wherein each of the pluralities of thinly sawn boards has a thickness from a range of about 6.35 mm to about 19.00 mm (¼ in to 3.4 in) and a width from a range of about 10.15 cm to about 20.30 cm (4 in to 8 in).

11. The elongate interlocking composite bamboo industrial mat of claim 9, wherein the pluralities of thinly sawn boards are hardwood boards or softwood boards.

12. An elongate interlocking composite bamboo industrial mat, comprising:
   top layer having a plurality of equidistantly spaced-apart elongate laminated composite bamboo boards arranged in parallel;

a bottom layer having
- a male end with a metal Z-bend beam having at least two equidistantly spaced fingers extending outward therefrom,
- a female end with a hollow metal beam with at least two matching equidistantly receptacles extending thereinto,
- a pair of matching metal U-shaped channels equidistantly spaced from the male end and the female end wherein a space between each of the pair of metal U-shaped channels enables sliding communication of a forklift fork with the pair of metal U-shaped channels, and
- a plurality of equidistantly spaced-apart elongate laminated composite bamboo boards arranged perpendicular to the top layer and in parallel between the male end and one of the pair of U-channels, between the pair of U-channels, and between the other of the pair of U-channels and the female end,
- wherein the male end, the female end, the pair of U-channels, and the plurality of equidistantly spaced-apart elongate laminated composite bamboo boards have the same height; and a plurality of fasteners securely engaging each of the plurality of equidistantly spaced-apart elongate laminated composite bamboo boards to the male end, the female end, the pair of matching metal U-shaped channels, and the plurality of equidistantly spaced-apart elongate laminated composite bamboo boards of the bottom layer, therein each of the plurality of fasteners includes a bolt, an outward-facing concave washer engaged with a head of the bolt, and one of a sleeve nut or sleeve anchor nut and optionally having an outward-facing washer engaged with a head of the sleeve nut.

13. A method for producing elongate laminated composite bamboo panels, the method comprising:
   crushing a plurality of bamboo poles to produce elongate asymmetrically fractured bamboo strips;
steaming the fractured bamboo strips for about two to four hours under a steam pressure of about 200 kPa to about 400 kPa;
   drying the fractured bamboo strips at a temperature of about 60° C. to about 80° C. to a moisture content of less than 10% wt/wt;
   cooling the dried fractured bamboo strips to an ambient temperature while maintaining the moisture content at less than 10% wt/wt;
   coating the cooled, dried fractured bamboo strips with a thermoset fluid adhesive, allowing excess adhesive to flow by gravity from the adhesive-coated fractured bamboo strips;
   drying the adhesive-coated fractured bamboo strips at a temperature from a range of about 35° C. to about 55° C., to a moisture content of 10% wt/wt or less;
   loading a selected plurality of the dried adhesive-coated fractured bamboo strips onto a bed of a flatbed hydraulic press, heating the bed to about 120° C. and applying a pressure dried adhesive-coated fractured bamboo strips from 8 kPa to about 1300 kPa for about 10 min to about 60 min to thereby produce an elongate laminated composite bamboo panel;
   cooling the elongate laminated composite bamboo panel under an ambient temperature for about 24 hours;
   trimming the ends and side edges of the cooled elongate laminated composite bamboo panel; and optionally
   sawing the elongate laminated composite bamboo panel into selected lengths and widths.

14. The method claim 13, additionally comprising:
   splitting a plurality of bamboo poles to produce a plurality of elongate split bamboo strips;
   crushing the plurality of bamboo poles to produce elongate asymmetrically fractured bamboo strips.

15. The method claim 13, wherein thermoset fluid adhesive is a resole phenolic resin.

16. Use of the elongate laminated composite bamboo panels produced according to the method of claim 13, to assemble an elongate interlocking composite bamboo industrial mat comprising:
   an upper layer having two or more elongate laminated composite bamboo panels arranged in parallel, in contact, thereby forming one or more upper side joints;
   an intermediate layer having a plurality of elongate laminated composite bamboo panels arranged in parallel, in contact, and perpendicular to the laminated composite bamboo panels in the upper layer, thereby forming a plurality of intermediate side joints;
   a bottom layer having a plurality of elongate laminated composite bamboo panels arranged in parallel to the upper layer, in contact, thereby forming two or more bottom side joints wherein the two or more bottom side joints overlap the one or more upper side joints; and
   a plurality of fasteners securing together the upper layer of elongate laminated composite bamboo panels, the intermediate layer of elongate laminated composite bamboo panels, and the bottom layer of elongate laminated composite bamboo panels through bores provided therefor, wherein each of the plurality of fasteners consists of a bolt, an outward-facing concave washer engaged with a head of the bolt, and one of a sleeve nut having an outward-facing washer engaged with a head of the sleeve nut or a sleeved anchor nut having an outward-facing concave washer engaged with a head of the sleeve anchor nut;
   wherein each of the elongate laminated composite bamboo panels comprises a plurality of kiln-dried glue-dipped elongate asymmetrically fractured bamboo strips compressed into a solid panel devoid of air spaces; and
   wherein the elongate interlocking composite bamboo industrial mat is configured to interlock end-to-end with another matching elongate interlocking composite bamboo industrial mat, or alternatively, is configured to interlock side-to-side with another matching elongate interlocking composite bamboo industrial mat.

17. The use of claim 16, wherein the intermediate layer has between three stacked rows to seven stacked rows of pluralities of thinly sawn boards arranged in parallel, in contact, and perpendicular to the laminated composite bamboo panels in the upper layer, wherein a first plurality of intermediate side joints in a first stacked layer overlaps a second plurality of intermediate side joints in a stacked layer, and wherein each of the pluralities of thinly sawn boards has a thickness from a range of about 6.35 mm to about 19.00 mm (¼ in to 3.4 in) and a width from a range of about 10.15 cm to about 20.30 cm (4 in to 8 in).

* * * * *